United States Patent
Grossman et al.

(10) Patent No.: US 11,423,801 B2
(45) Date of Patent: Aug. 23, 2022

(54) TUTORIAL-BASED TECHNIQUES FOR BUILDING COMPUTING SYSTEMS

(71) Applicant: AUTODESK, INC., San Rafael, CA (US)

(72) Inventors: Tovi Grossman, Toronto (CA); Jeremy Warner, Berkeley, CA (US); George Fitzmaurice, Toronto (CA); Benjamin Lafreniere, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 287 days.

(21) Appl. No.: 16/051,387

(22) Filed: Jul. 31, 2018

(65) Prior Publication Data
US 2020/0043363 A1 Feb. 6, 2020

(51) Int. Cl.
*G09B 19/00* (2006.01)
*G06F 9/22* (2006.01)
*G09B 7/08* (2006.01)

(52) U.S. Cl.
CPC ......... *G09B 19/0053* (2013.01); *G06F 9/223* (2013.01); *G09B 7/08* (2013.01)

(58) Field of Classification Search
CPC ........ G09B 7/08; G09B 19/0053; G06F 9/223
See application file for complete search history.

(56) References Cited

U.S. PATENT DOCUMENTS

| | | | | |
|---|---|---|---|---|
| 9,665,234 | B2 * | 5/2017 | Lafreniere | ............... G09B 7/02 |
| 9,805,482 | B2 * | 10/2017 | Fernquist | ............. G06T 11/203 |
| 2004/0096812 | A1 * | 5/2004 | Goh | ..................... G09B 23/185 |
| | | | | 434/379 |
| 2008/0068816 | A1 * | 3/2008 | Han | ..................... H05K 1/0286 |
| | | | | 439/39 |

(Continued)

OTHER PUBLICATIONS

Anderson et al., 2017. Trigger-Action-Circuits: Leveraging Generative Design to Enable Novices to Design and Build Circuitry. In Proceedings of the 30th Annual ACM Symposium on User Interface Software and Technology (UIST 17), https://doi.org/10.1145/3126594.3126637, Oct. 22-25, 2017, pp. 331-342.

(Continued)

*Primary Examiner* — Malina D. Blaise
(74) *Attorney, Agent, or Firm* — Artegis Law Group, LLP

(57) ABSTRACT

A tutorial system presents a tutorial comprising a series of steps for building a computing system and testing successful completion of at least one of the steps. The computing system comprises a programmable controller and at least one hardware component. The tutorial system is coupled to the target computing system via a connection. The tutorial system may present one or more programming steps for the user to enter and load particular programming to the controller. The tutorial system may further present one or more physical steps for the user to physically configure a particular hardware component, such as physically configuring connections or wiring between the particular hardware component and the controller and/or another hardware compo- (Continued)

nent of the computing system. The tutorial system directly tests successful completion of a physical step or a programming step through values received from the computing system via the connection.

20 Claims, 9 Drawing Sheets

(56) References Cited

U.S. PATENT DOCUMENTS

| | | | | |
|---|---|---|---|---|
| 2009/0293040 | A1* | 11/2009 | DeBoer | G09B 7/00 717/109 |
| 2009/0298023 | A1* | 12/2009 | Kim | G09B 23/183 434/224 |
| 2012/0317801 | A1* | 12/2012 | Chen | H05K 7/1038 29/831 |
| 2016/0028693 | A1* | 1/2016 | Crawford | H04L 61/2007 726/12 |
| 2016/0225281 | A1* | 8/2016 | Kim | G09B 23/18 |
| 2016/0365001 | A1* | 12/2016 | Shim | G09B 23/185 |
| 2019/0132399 | A1* | 5/2019 | Henning | H04L 63/10 |

OTHER PUBLICATIONS

Beck, Kent. "Test Driven Development: By Example", Addison-Wesley, 2002, retrieved Jun. 9, 2020 from https://docs.google.com/viewer?a=v&pid=sites&srcid=ZGVmYXVsdGRvbWFpbnx0ZXN0MTIzNHNpbTQ2NXxneDpiYTJmYWIwYTAyOGJiZmQ, 217 pages.

Bergman et al., DocWizards: a system for authoring follow-me documentation wizards. In Proceedings of the 18th annual ACM symposium on User interface software and technology (UIST '05), https://doi.org/10.1145/1095034.1095067, pp. 191-200.

Booth et al., "Crossed Wires: Investigating the Problems of End-User Developers in a Physical Computing Task", In Proceedings of the 2016 CHI Conference on Human Factors in Computing Systems (CHI '16), https://doi.org/10.1145/2858036.2858533, 2016, pp. 3485-3497.

Carroll et al., "Paradox of the active user," in Interfacing Thought: Cognitive Aspects of Human-Computer Interaction, MIT Press, 1987, pp. 80-111. Retrieved Jun. 9, 2020 from https://citeseerx.ist.psu.edu/viewdoc/download/?doi=10.1.1.35.1606&rep=rep1&type=pdf.

Chi et al.,"Eliciting self-explanations improves understanding", https://doi.org/10.1016/0364-0213(94)90016-7, Cognitive Science vol. 18, No. 3, 1994, pp. 439-477.

Drew et al., "The Toastboard: Ubiquitous Instrumentation and Automated Checking of Breadboarded Circuits", In Proceedings of the 29th Annual Symposium on User Interface Software and Technology (UIST '16), https://doi.org/10.1145/2984511.2984566, 2016, pp. 677-686.

Fernquist et al.,"Sketch-Sketch Revolution: An Engaging Tutorial System for Guided Sketching and Application Learning", In Proceedings of the 24th annual ACM symposium on User interface software and technology (UIST '11), https://doi.org/10.1145/2047196.2047245, 2011, pp. 373-382.

Gier et al., "Incorporating Active Learning with PowerPoint-Based Lectures Using Content-Based Questions", https://doi.org/10.1080/00986280902739792, Teaching of Psychology vol. 36, No. 2, 2009, pp. 134-139.

Glassman et al., "Learnersourcing Personalized Hints", In Proceedings of the 19th ACM Conference on Computer-Supported Cooperative Work & Social Computing (CSCW '16), https://doi.org/10.1145/2818048.2820011, 2016, pp. 1626-1636.

Grabler et al., "Generating Photo Manipulation Tutorials by Demonstration", In ACM SIGGRAPH 2009 papers (SIGGRAPH '09), https://doi.org/10.1145/1576246.1531372, 2009, pp. 66:1-66:9.

Grossman et al., "ToolClips: An Investigation of Contextual Video Assistance for Functionality Understanding", In Proceedings of the SIGCHI Conference on Human Factors in Computing Systems (CHI '10), https://doi.org/10.1145/1753326.1753552, Apr. 10-15, 2010, pp. 1515-1524.

Hartmann et al., "Authoring Sensor-based Interactions by Demonstration with Direct Manipulation and Pattern Recognition", In Proceedings of the SIGCHI Conference on Human Factors in Computing Systems (CHI '07), https://doi.org/10.1145/1240624.1240646, 2007, Apr. 28-May 3, 2007, pp. 145-154.

Hartmann et al., Reflective Physical Prototyping Through Integrated Design, Test, and Analysis. In Proceedings of the 19th Annual ACM Symposium on User Interface Software and Technology (UIST '06), https://doi.org/10.1145/1166253.1166300, Oct. 15-18, 2006, pp. 299-308.

Kelleher et al., Stencils-based tutorials: Design and evaluation. In Proceedings of the SIGCHI Conference on Human Factors in Computing Systems (CHI '05), https://doi.org/10.1145/1054972.1055047, 2005, pp. 541-550.

Kim, Juho, "Learnersourcing: Improving Learning with Collective Learner Activity", PhD thesis, Massachusetts Institute of Technology, 2015, 213 pages.

Kim et al., "Crowdsourcing Step-by-Step Information Extraction to Enhance Existing How-to Videos", In Proceedings of the SIGCHI Conference on Human Factors in Computing Systems (CHI '14), https://doi.org/10.1145/2556288.2556986, 2014, pp. 4017-4026.

Knibbe et al., "Smart Makerspace: An Immersive Instructional Space for Physical Tasks", In Proceedings of the 2015 International Conference on Interactive Tabletops & Surfaces (ITS '15), https://doi.org/10.1145/2817721.281//41, Nov. 15-18, 2015, pp. 83-92.

Lafreniere et al., "Task-Centric Interfaces for Feature-Rich Software", In Proceedings of the 26th Australian Computer-Human Interaction Conference (OZCHI '14), 2014, pp. 49-58.

Lafreniere et al., "Crowdsourced Fabrication", In Proceedings of the 29th Annual Symposium on User Interface Software and Technology (UIST '16), https://doi.org/10.1145/2984511.2984553, Oct. 16-19, 2016, pp. 15-28.

Lafreniere et al., "Community Enhanced Tutorials: Improving Tutorials with Multiple Demonstrations", In Proceedings of the SIGCHI Conference on Human Factors in Computing Systems (CHI '13), https://doi.org/10.1145/2470654.2466235, Apr. 27-May 2, 2013, pp. 1779-1788.

Li et al., GamiCAD: A Gamified Tutorial System for First Time Autocad Users. In Proceedings of the 25th Annual ACM Symposium on User Interface Software and Technology (UIST '12), https://doi.org/101145/2380116.2380131, Oct. 7-10, 2012, pp. 103-112.

McGrath et al., "Bifrost: Visualizing and Checking Behavior of Embedded Systems Across Hardware and Software", In Proceedings of the 30th Annual ACM Symposium on User Interface Software and Technology (UIST '17), https://doi.org/10.1145/3126594.3126658, Oct. 22-25, 2017, pp. 299-310.

Mellis et al.,"Engaging Amateurs in the Design, Fabrication, and Assembly of Electronic Devices", In Proceedings of the 2016 ACM Conference on Designing Interactive Systems (DIS '16), https://doi.org/10.1145/2901790.2901833, Jun. 4-8, 2016, pp. 1270-1281.

Mysore et al., Torta: Generating Mixed-Media GUI and Command-Line App Tutorials Using Operating-System-Wide Activity Tracing. In Proceedings of the 30th Annual ACM Symposium on User Interface Software and Technology (UIST '17), https://doi.org/10.1145/3126594.3126628, Oct. 22-25, 2017, pp. 703-714.

Palmiter et al., "Animated demonstrations vs written instructions for learning procedural tasks: a preliminary investigation", international journal of man-machine studies, vol. 34, No. 5, https://doi.org/10.1016/0020-7373(91)90019-4, 1991, pp. 687-701.

Pongnumkul et al., Pause-and-play: automatically linking screencast video tutorials with applications. In Proceedings of the 24th annual ACM symposium on User interface software and technology (UIST '11), https://doi.org/10.1145/2047196.2047213, Oct. 16-19, 2011, pp. 135-144.

Ramesh et al., ShowMeHow: translating user interface instructions between applications. In Proceedings of the 24th annual ACM symposium on User interface software and technology (UIST '11), https://doi.org/10.1145/2047196.2047212, Oct. 16-19, 2011, pp. 127-134.

(56) References Cited

OTHER PUBLICATIONS

Schoop et al., "Drill Sergeant: Supporting Physical Construction Projects Through an Ecosystem of Augmented Tools", In Proceedings of the 2016 CHI Conference Extended Abstracts on Human Factors in Computing Systems (CHI EA'16), https://doi.org/10.1145/2851581.2892429, pp. 1607-1614.

Shin et al., Understanding the Effect of In-Video Prompting on Learners and Instructors. In Proceedings of the SIGCHI Conference on Human Factors in Computing Systems (CHI '18), Apr. 21-26, 2018, 12 pages.

Strasnick et al., Scanalog: Interactive Design and Debugging of Analog Circuits with Programmable Hardware. In Proceedings of the 30th Annual ACM Symposium on User Interface Software and Technology (UIST '17), https://doi.org/10.1145/3126594.3126618, 2017, Oct. 22-25, 2017, pp. 321-330.

Tuck et al., "Help by guided tasks: utilizing UIMS knowledge", In Proceedings of the SIGCHI conference on Human factors in computing systems: Empowering people (CHI '90), https://doi.org/10.1145/97243.97254, 1990, pp. 71-78.

Weichel et al., SPATA: Spatio-Tangible Tools for Fabrication-Aware Design, In Proceedings of the Ninth International Conference on Tangible, Embedded, and Embodied Interaction (TEI '15), https://doi.org/10.1145/2677199.2680576, Jan. 15-19, 2015, pp. 189-196.

Wiilllliams et al., AXIS: Generating Explanations at Scale with Learnersourcing and Machine Learning. In Proceedings of the Third (2016) ACM Conference on Learning @ Scale (L@S '16), 379-388. https://doi.org/10.1145/2876034.2876042, Apr. 25-26, 2016, 10 pages.

Wu et al., Circuitsense: Automatic Sensing of Physical Circuits and Generation of Virtual Circuits to Support Software Tools. In Proceedings of the 30th Annual ACM Symposium on User Interface Software and Technology (UIST '17), https://doi.org/10.1145/3126594.3126634, Oct. 22-25, 2017, pp. 311-319.

Codecademy, Learn to Code—for Free | Codecademy, Retrieved Feb. 27, 2020 from https://www.codecademy.com/, 6 pages.

Khan Academy | Free Online Courses, Lessons & Practice, Retrieved Feb. 27, 2020 from http://www.khanacademy.org, 6 pages.

\* cited by examiner

| Test Setup | Test Verification | Test Domain | |
|---|---|---|---|
| | | Software | Physical |
| Manual | Manual | $S_{M,M}$ | $P_{M,M}$ |
| Manual | Automatic | $S_{M,A}$ | $P_{M,A}$ |
| Automatic | Manual | $S_{A,M}$ | $P_{A,M}$ |
| Automatic | Automatic | $S_{A,A}$ | $P_{A,A}$ |
| None | Manual | $S_{N,M}$ | $P_{N,M}$ |

Figure 7

TUTORIAL-BASED TECHNIQUES FOR BUILDING COMPUTING SYSTEMS

BACKGROUND

Field of the Various Embodiments

Embodiments of the present invention generally relate to computer-aided tutorials and, more specifically, to tutorial-based techniques for building computing systems.

Description of the Related Art

Conventional tutorial systems that are designed to teach users how to use various software applications typically present a tutorial to a given user that include a series of steps related to a particular software application that are to be completed by the user. A few conventional tutorial systems also implement one or more reactive elements that monitor the activities of a user during the presentation of a given tutorial, whereby the tutorial advances the user to the next step in the series of steps when the user successfully completes the current step in the series of steps. Such "reactive" tutorial systems are designed to respond to the different actions and progressions of the user. These types of tutorial systems are typically effective in teaching users software-based tasks where user activities are easily detected by the tutorial systems. For example, tutorial systems designed to teach users particular functions of a software application (such as a computer-aided design application) are able to easily detect the input and selection activities of a user as the user interacts with the software application.

However, conventional tutorial systems are not effective when presenting tutorials for tasks that are physical in nature as conventional tutorial systems cannot detect the physical activities of the users. Consequently, for a task that includes any steps that are physical in nature, a conventional tutorial system must rely on assessments of the user for performance of the physical steps. However, oftentimes a user assesses that a physical step in the task has been performed correctly, when in fact the physical step has been performed incorrectly. The incorrect performance of any physical step can quickly derail the tutorial for the task and confuse and frustrate the user performing the task.

Accordingly, one drawback of conventional tutorial systems is that a conventional tutorial system cannot directly assess/determine whether a user has correctly performed a physical step included in a tutorial. Consequently, a conventional tutorial system cannot accurately monitor the progression of a user through the steps included in such a tutorial. This particular drawback of conventional tutorial systems is particularly prominent in tutorials designed to help users build computing systems because such tutorials oftentimes include a combination of complex physical steps (hardware-based steps) and complex programming steps (software-based steps). As conventional tutorial systems cannot directly assess/determine if each physical step is performed correctly by the user and rely on user assessments of the successful completion of physical steps, the tutorial may be quickly disrupted if a single physical step is in fact not performed correctly. Thus, conventional tutorial systems are ineffective for providing tutorials on building computing systems and often result in the user becoming overwhelmed and frustrated with the task and the computing system being left uncompleted.

As the foregoing illustrates, what is needed in the art are more effective tutorial-based techniques for building computing systems.

SUMMARY

Various embodiments described herein include a computer-implemented method comprising displaying to a user a first step for physically configuring a first hardware component of a target computing system. The method also includes, once the first hardware component is configured, receiving a first set of values from a controller included in the target computing system via a first connection and determining whether the first step has been performed correctly based on the first set of values. The method also includes, in response to determining that the first step has been performed correctly, displaying to the user an indication that the first step has been performed correctly. The method further includes, in response to determining that the first step has not been performed correctly, displaying to the user an indication that the first step has not been performed correctly.

At least one technological improvement of the disclosed techniques relative to prior art is that the tutorial system displays a physical step for building a target computing system and can determine whether the physical step has been performed correctly by a user based on values received from the target computing system. Thus, the disclosed techniques enable the tutorial system to automatically assess/determine whether a physical step for building a target computing system has been performed correctly by the user, without having to rely on any input or feedback from the user assessment.

At least one other technological improvement of the disclosed techniques relative to prior art is that the tutorial system can determine whether a current physical step has been performed correctly by a user and, if not, stop the progression of the tutorial until the current physical step is determined to have performed correctly by the user. In this manner, the tutorial system can accurately monitor and control the progression of the steps in a given tutorial to ensure that each step has been performed correctly by the user before progressing to the next step in the tutorial. Thus, the disclosed techniques allow users to more easily progress though a tutorial for building computing systems, reduce the time needed to complete the tutorial by substantially eliminating backtracking and troubleshooting errors made in earlier steps in the tutorial, increase the rate for successfully completing the tutorial, and improves user comprehension and confidence in building computing systems.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 7 illustrates a test taxonomy that can be implemented in the tutorial UI of FIG. 3, according to various embodiments of the present invention;

DETAILED DESCRIPTION

Figure 1:
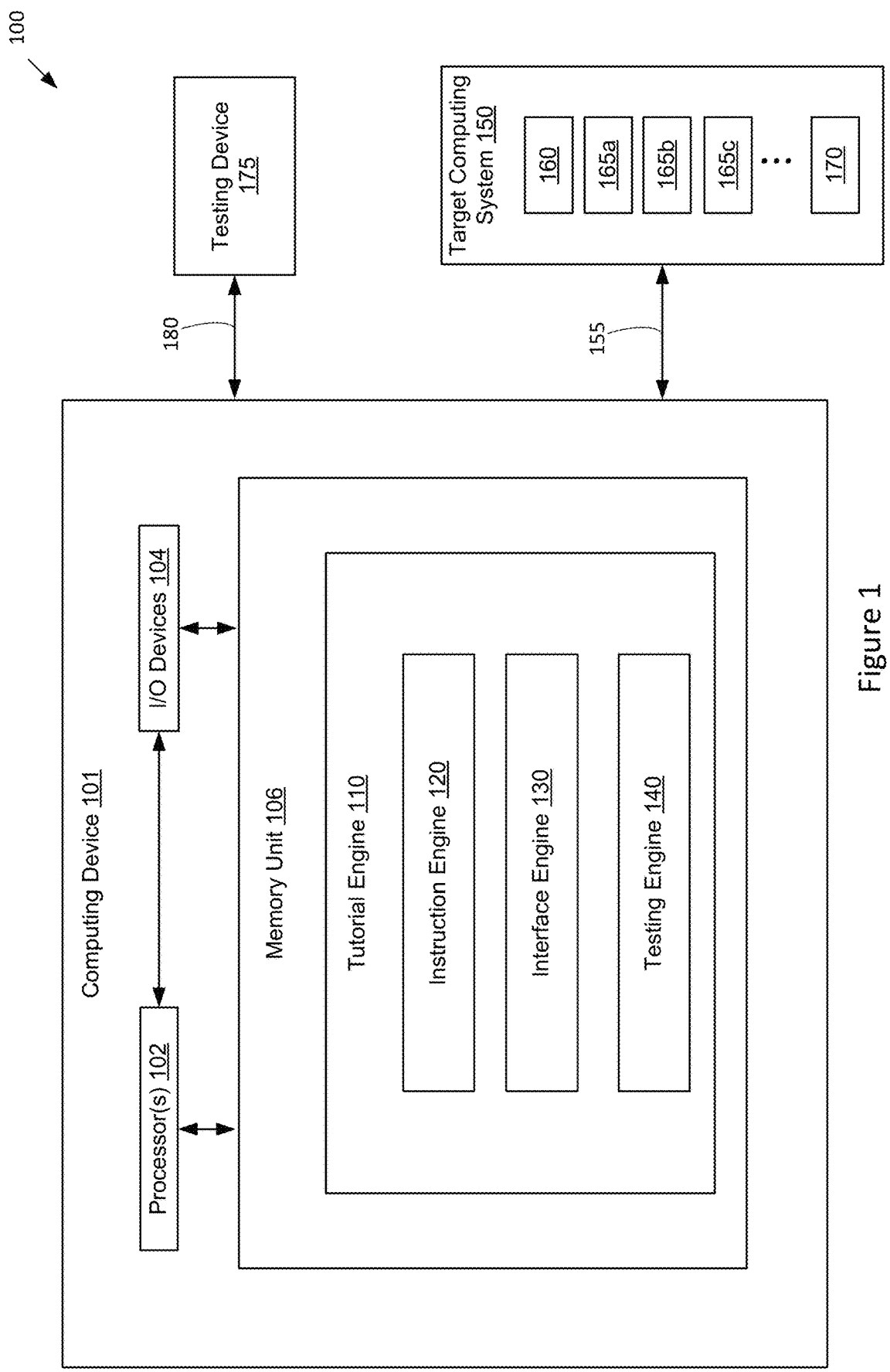
FIG. 1 illustrates a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

As used herein, a "task" comprises an overall goal of a tutorial, such as building a target computing system. In some embodiments, a task comprises a series of steps that are to be completed in a predetermined sequence/order as presented in the tutorial. The series of steps of a task may include a combination of "physical steps" and "programming steps." A physical step comprises a hardware-based step, such as a step that includes physically setting up/configuring a hardware component of the target computing system. A programming step comprises a software-based step, such as entering, compiling, and loading particular programming to the target system for execution. As used herein, "programming" may comprise any type of programming or coding for configuring a controller to perform one or more functions.

As disclosed in the embodiments herein, a tutorial system presents a tutorial comprising a series of steps for building a target computing system and testing successful completion of at least one of the steps of the tutorial. In this regard, the tutorial system presents a test-driven tutorial whereby a current step of the tutorial is presented to the user, successful completion of the current step is tested by the tutorial system to determine whether the current step is performed correctly by the user, and the tutorial progresses to the next step (and present the next step) upon determining that the current step is correctly performed by the user. The tutorial system is coupled to the target computing system via a first connection. The tutorial system directly tests successful completion of a physical step or a programming step through values/measurements received from the target computing system via the first connection, and not rely on receiving user assessments of the successful completion of a step.

In some embodiments, the target computing system comprises a programmable microcontroller and at least one other hardware component that is to be configured to form a particular computing system or device that performs a particular set of functions (such as a light-sensitive alarm clock). The tutorial system presents a tutorial comprising one or more programming steps for configuring the programming executed by the microcontroller and one or more physical steps for physically setting up/configuring the microcontroller and hardware components.

In these embodiments, the tutorial system presents one or more programming steps for the user to enter, compile, and load specific programming to the microcontroller, such as programming to configure the target computing system to perform one or more specific functions. The tutorial system automatically inserts additional programming to configure the microcontroller to return requested values during execution of the user programming. During execution of the programming by the microcontroller, the microcontroller then transmits the requested values to the tutorial system via the first connection. The tutorial system then tests if the programming step is passed by determining if the programming step was performed correctly based on the received values.

The tutorial system further presents one or more physical steps for the user to physically configure/setup a particular hardware component, such as physically configuring connections or wiring between the particular hardware component and the microcontroller and/or another hardware component of the target computing system. Further examples of physical steps include connecting the particular hardware component (such as an electronic component) to a breadboard device, wiring the particular hardware component to a breadboard device and then wiring the particular hardware component to a breadboard device to the microcontroller, or attaching/building other physical non-electronic components of the target computing system (such as the body and wheels of a robot target system).

After a user indicates that the user has completed the physical step, the tutorial system automatically generates, compiles, and loads test programming associated with the physical step and/or the particular hardware component to configure the microcontroller to return particular values during execution of the test programming. During execution of the test programming by the microcontroller, the microcontroller then transmits the requested values to the tutorial system via the first connection. The tutorial system then tests if the physical step is passed by determining if the physical step was performed correctly based on the received values.

In further embodiments, if the tutorial system determines that a current step has been performed correctly by the user, the tutorial system displays an indication to the user that the current step is successfully completed and permits the user to progress to a next step of the tutorial, and subsequently presents the next step. If the tutorial system determines that a current step has not been performed correctly by the user, the tutorial system displays an indication to the user that the current step has not been successfully completed and does not permit the user to progress to a next step of the tutorial until the current step is successfully completed.

Thus, the disclosed techniques enable the tutorial system to directly assess/determine if a physical step or programming step for building the target computing system is performed correctly, without relying on receiving the user assessment of whether the step is performed correctly. Further, the tutorial system can accurately monitor and control the progression of the steps in the tutorial to ensure that each step is performed correctly before moving on to a next step of the tutorial. Thus, the disclosed tutorial system allows users to more easily complete a tutorial for building computing systems, reduces the time needed for completing the tutorial by reducing the need to backtrack and troubleshoot errors made on previous steps, increases the rate for successfully completing the tutorial and improve users' comprehension and confidence in building computing systems.

Overview of System

FIG. 1 illustrates a system configured to implement one or more aspects of the present invention. As shown, the environment 100 includes a computing device 101, a target computing system 150, and an optional testing device 175. The computing device 101 and optional testing device 175 may comprise a tutorial system for presenting a tutorial for building the target computing system 150 and testing for successful completion of various steps of the tutorial.

Computing device 101 may be a server system, client system, workstation, a laptop computer, a tablet or handheld device, or any other type of computing device. Computing device 101 includes one or more processing units 102 coupled to input/output (I/O) devices 104 and to memory unit 106. Processing unit(s) 102 may be a central processing unit (CPU), a graphics processing unit (GPU), or a combination of different processing units, such as a CPU configured to operate in conjunction with a GPU. In general, processing unit 102 may be any technically feasible hardware unit capable of processing data and/or executing software applications. I/O devices 104 are also coupled to memory unit 106 and incudes input devices capable of receiving user input, output devices capable of generating output. Examples of input devices include a keyboard, a mouse, a touchscreen, a microphone, or other input elements. Examples of output devices include a monitor display, audio speakers/headphones, a printer, or other output elements. I/O devices 104 may be configured to receive various types of input from an end-user of the environment 100, and to also provide various types of output to the end-user of the environment 100, such as a tutorial user interface for displaying output to a user and receiving input from the user. The I/O devices 104 also include port interface or connection components for connecting the computing device 101 to the target computing system 150 and/or testing device 175 via a connection (such as first connection 155 and/or second connection 180).

The memory unit 106 may include a hard disk, a random access memory (RAM) module, a flash memory unit, or any other type of memory unit or combination thereof. Processor 102 and I/O devices 104 are configured to read data from and write data to memory 106. The memory unit 106 is configured to store software application(s) and data. Instructions from the software constructs within the memory unit 106 are executed by processors 102 to enable the inventive operations and functions described herein. In various embodiments, the memory unit 106 is configured to store a tutorial engine 110 comprising an instruction engine 120, an interface engine 130, and a testing engine 140 that provide an underlying functionality of techniques described in various embodiments herein. In various embodiments, the memory unit 106 is configured to store a tutorial engine 110 comprising an instruction engine 120, an interface engine 130, and a testing engine 140 that provide an underlying functionality of techniques described in various embodiments herein.

In some embodiments, the tutorial engine 110 generates a tutorial user interface for presenting a tutorial of a series of steps for building the target computing system 150 and testing for successful completion of various steps of the tutorial. The tutorial user interface comprises an instruction panel generated by the instruction engine 120, an interface panel generated by the interface engine 130, and a testing panel generated by the testing engine 140. In these embodiments, the tutorial engine 110 may initiate and coordinate various operations and functions performed by the instruction engine 120, interface engine 130, and testing engine 140 to provide an underlying functionality of the tutorial user interface as described herein.

In general, the instruction panel displays instructional information for performing a current step of the tutorial, such as an image or video that graphically illustrates how to perform the current step and/or a set of text instructions that describe how to perform the current step. The interface panel comprises a panel for interfacing with the target computing system 150 for entering and loading programming to the target computing system 150 for the current step and for receiving requested values/measurements from the target computing system 150 during execution of the programming on the target computing system 150. The interface engine 130 generates the interface panel and thus manages interface and communications between the tutorial system and the target computing system 150. In some embodiments, the interface engine 130 comprises an integrated development environment (IDE) code editor and the interface panel comprises an IDE user interface. In other embodiments, the interface engine 130 comprises any type of programming and code editor. The testing panel comprises a panel for performing testing of the current step (to determine if the current step has been performed correctly) and displaying test results for the current step (indicating whether or not the current step has been performed correctly).

As shown in FIG. 1, the computing device 101 (tutorial system) is connected to the target computing system 150 via a first connection 155. For example, the first connection 155 may comprise a serial port connection, such as a Universal Serial Bus (USB) connection. In other embodiments, the first connection 155 may comprise another type of connection. The first connection 155 enables the tutorial engine 110 to directly interface with the target computing system 150, for example, to load programming onto the target computing system 150 and/or perform testing on the target computing system 150.

The target computing system 150 may comprise a controller 160 and one or more other hardware components 165 (such as 165a, 165b, 165c, etc.). In some embodiments, the controller 160 comprises a programmable microcontroller, such as an Arduino® microcontroller that is programmable via an IDE code editor and user interface. In these embodiments, the computing device 101 (tutorial system) is connected to the controller 160 of the target computing system 150 via the first connection 155 for loading programming onto the controller 160 and/or performing testing on the target computing system 150 via the controller 160. The target computing system 150 may further comprise a breadboard device 170 used for physically wiring and electrically interconnecting the controller 160 and various hardware components 165 of the target computing system 150. For example, the tutorial system may present a physical step that instructs the user to physically wire/interconnect the controller 160 and various hardware components 165 in a particular manner using the breadboard device 170. The tutorial system may then test if the user physically wired/ interconnected the controller 160 and various hardware components 165 via the breadboard device 170 in the correct manner (performed the physical step correctly).

In further embodiments, the tutorial system may also include an optional testing device 175 for performing targeted probing and testing for particular electrical attributes/measurements of the target computing system 150. The testing device 175 may be connected to the computing device 101 via a second connection 180. For example, the second connection 180 may comprise a serial port connection, such as a Universal Serial Bus (USB) connection. In other embodiments, the second connection 180 may comprise another type of connection. The second connection 180 enables the tutorial engine 110 to interface with the testing device 175, for example, to load test programming onto the testing device 175 and receive test measurements from the testing device 175. In some embodiments, the testing device 175 comprises a programmable microcontroller, such as an Arduino® microcontroller, and a set of electrical probes connected to the programmable microcontroller. In these embodiments, the computing device 101 generates and loads test programming onto the testing device 175 via an IDE editor to configure the testing device 175 to detect particular electrical attributes/measurements (e.g., voltage) of the target computing system 150 and transmit the detected measurements to the computing device 101. For example, the tutorial system may instruct the user to physically connect the probes of the testing device 175 to the breadboard device 170 in a particular manner, enter and load the test programming onto the testing device 175, receive test measurements from the testing device 175, and determine if a corresponding step of the tutorial is performed correctly based on the received test measurements.

Figure 2:
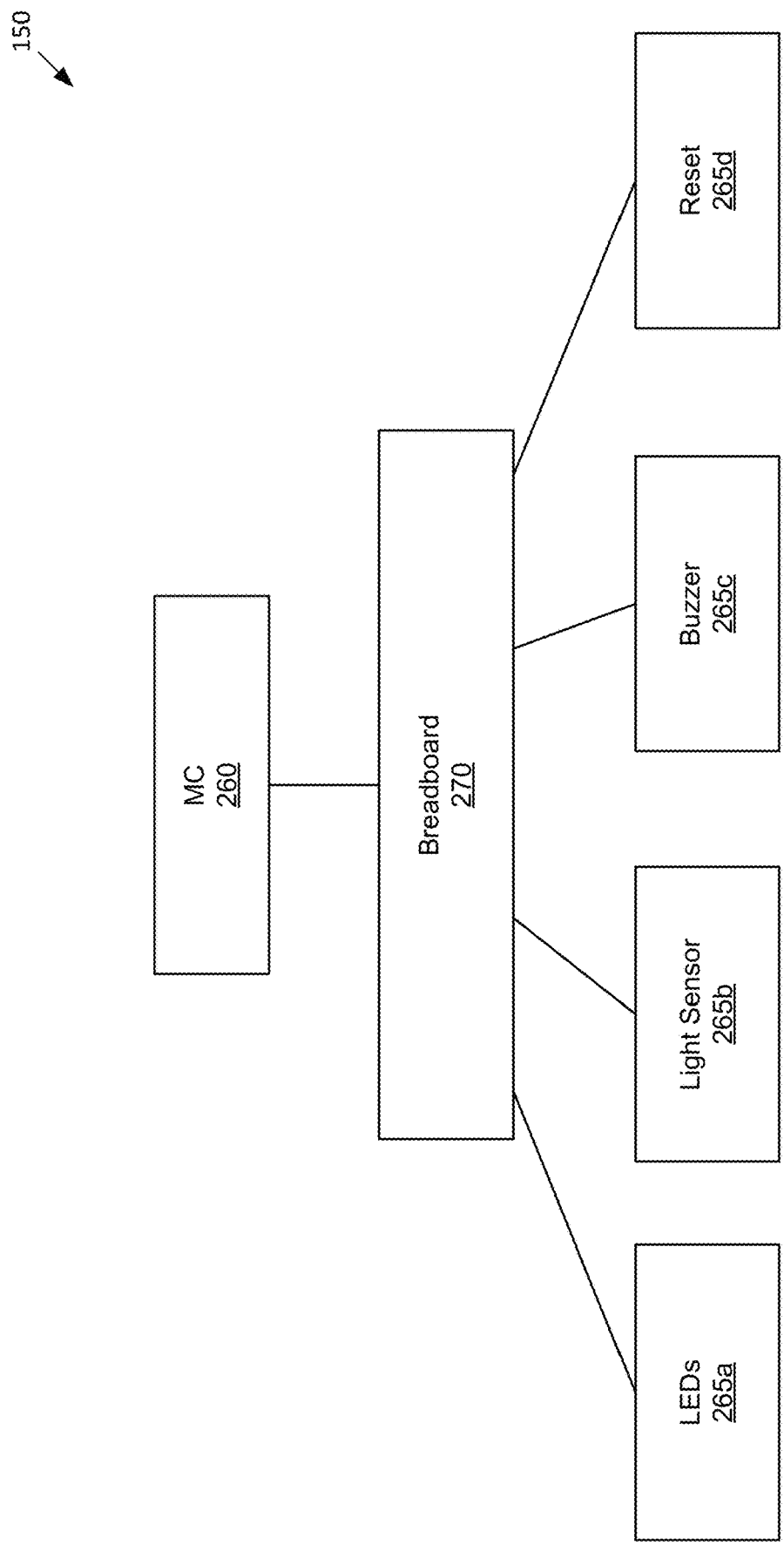
FIG. 2 is a conceptual illustration of the target computing system of FIG. 1, according to various embodiments of the present invention.

FIG. 2 is a conceptual illustration of the target computing system of FIG. 1, according to various embodiments of the present invention. As shown, the example target computing system 150 comprises a light-sensitive alarm clock system with a reset trigger. In particular, the example target computing system 150 comprises a computing device to be configured via a tutorial to perform the operations and functions of a light-sensitive alarm clock system. The tutorial system will present a tutorial comprising physical steps and programming steps to configure the target computing system 150 to function as a light-sensitive alarm clock, and also test various steps to verify the steps are performed correctly.

The example target computing system 150 comprises a programmable microcontroller 260 and a plurality of hardware components 265 that are electrically interconnected via a breadboard device 270. In some embodiments, the microcontroller 260 is electrically connected to a hardware component 265 and/or a first hardware component 265 is electrically connected to a second hardware component 265 via the breadboard device 270. In other embodiments, the microcontroller 260 is directly connected to a hardware component 265 and/or a first hardware component 265 is directly connected to a second hardware component 265 without use of the breadboard device 270. In the example of FIG. 2, the plurality of hardware components 265 includes an LED light ring 265*a*, a light sensor 265*b*, a piezoelectric buzzer 265*c*, and a reset button 265*d* to reset the alarm function.

Tutorial User Interface

Figure 3:
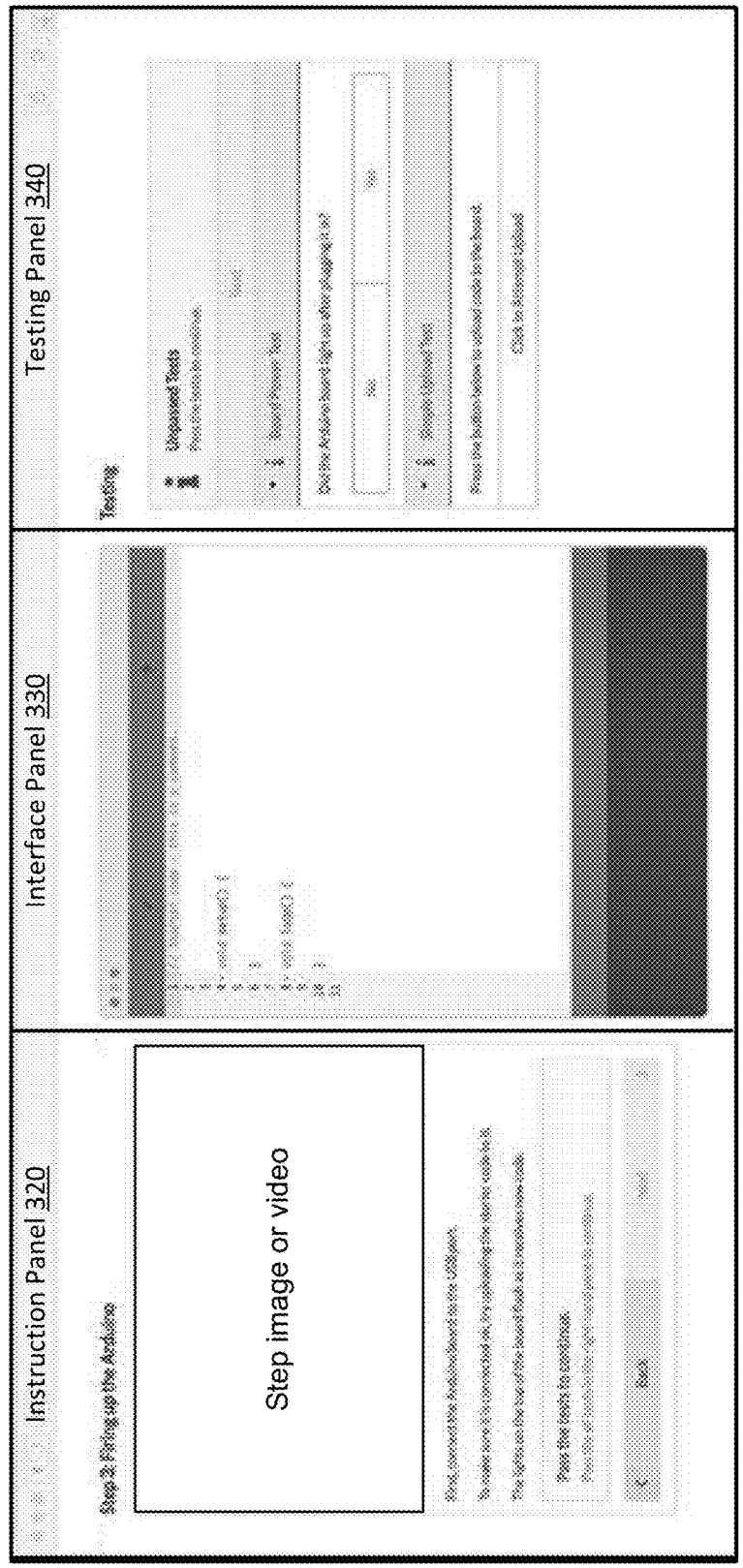
FIG. 3 illustrates a screenshot of a tutorial user interface (UI) that can be implemented on a tutorial engine of FIG. 1, according to various embodiments of the present invention.

FIG. 3 illustrates a screenshot of a tutorial user interface (UI) that can be implemented on a tutorial engine of FIG. 1, according to various embodiments of the present invention. In general, the tutorial engine 110 generates the tutorial UI 310 for presenting a tutorial of a series of steps for building the target computing system 150 and testing for successful completion of various steps of the tutorial. As shown, the tutorial UI 310 comprises a plurality of panels (sub-portions) including an instruction panel 320, an interface panel 330, and a testing panel 340. The instruction panel 320 is generated by the instruction engine 120, the interface panel 330 is generated by the interface engine 130, and the testing panel 340 is generated by the testing engine 140 of the tutorial engine 110. The instruction panel 320 may provide an interactive instructional environment, the interface panel 330 may provide an interactive programming/coding environment, and the testing panel 340 may provide an interactive testing environment. In these embodiments, the tutorial engine 110 may initiate and coordinate various operations and functions performed by the instruction engine 120, interface engine 130, and testing engine 140 to provide an underlying functionality of the tutorial UI 310 as described herein.

Figure 4:
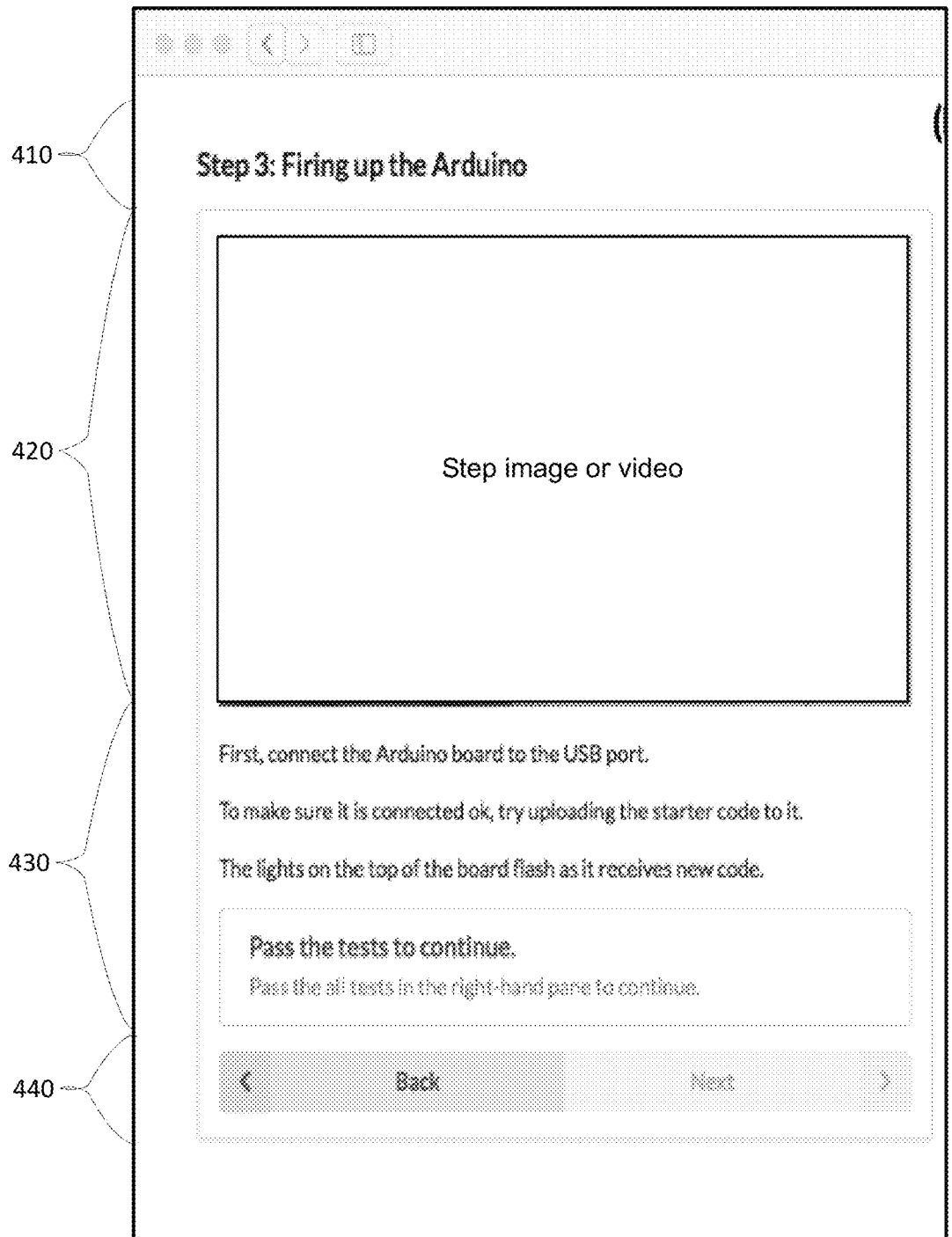
FIG. 4 illustrates an exemplary screenshot of the instruction panel of FIG. 3, according to various embodiments of the present invention.

FIG. 4 illustrates an exemplary screenshot of the instruction panel of FIG. 3, according to various embodiments of the present invention. As discussed above, a task may comprise an overall goal of a tutorial, such as building a target computing system comprising a light-sensitive alarm clock. The task may comprise a series of physical and/or programming steps that are to be completed in a predetermined sequence/order as presented in the tutorial. In general, the instruction panel 320 comprises a user interface for displaying instructional information for performing a current step of the overall task of the tutorial.

As shown, the instruction panel 320 includes a plurality of sections (sub-portions) including a first section 410, second section 420, third section 430, and a fourth section 440. The first section 410 displays text indicating a summary of the current step, such as a name or title of the step. The second section 420 displays a image and/or video that graphically/visually illustrates how to perform and complete the current step. The third section 430 displays a set of one or more text instructions that describe how to perform and complete the current step. The third section 430 may further include text indicating that all tests included in the testing panel 340 for the current step must be passed to proceed to the next step of the tutorial. The fourth section 440 displays selectable icons/buttons for navigating through the steps of the tutorial, such as a first icon ("back step" icon) for going back to a previous step and a second icon ("next step" icon) for moving forward to the next step of the tutorial. In some embodiments, the tutorial system enables the second icon to be selectable to move forward to the next step only if the tutorial system determines that all tests included in the testing panel 340 for the current step are passed, thus indicating that the current step has been completed correctly by the user. If the tutorial system determines that all tests included in the testing panel 340 for the current step are not passed (thus indicating that the current step has not been completed correctly by the user), the tutorial system will not enable the second icon to be selectable to move forward to the next step, thus ensuring that the user completes each step correctly before the user can move on to the next step of the tutorial.

Figure 5:
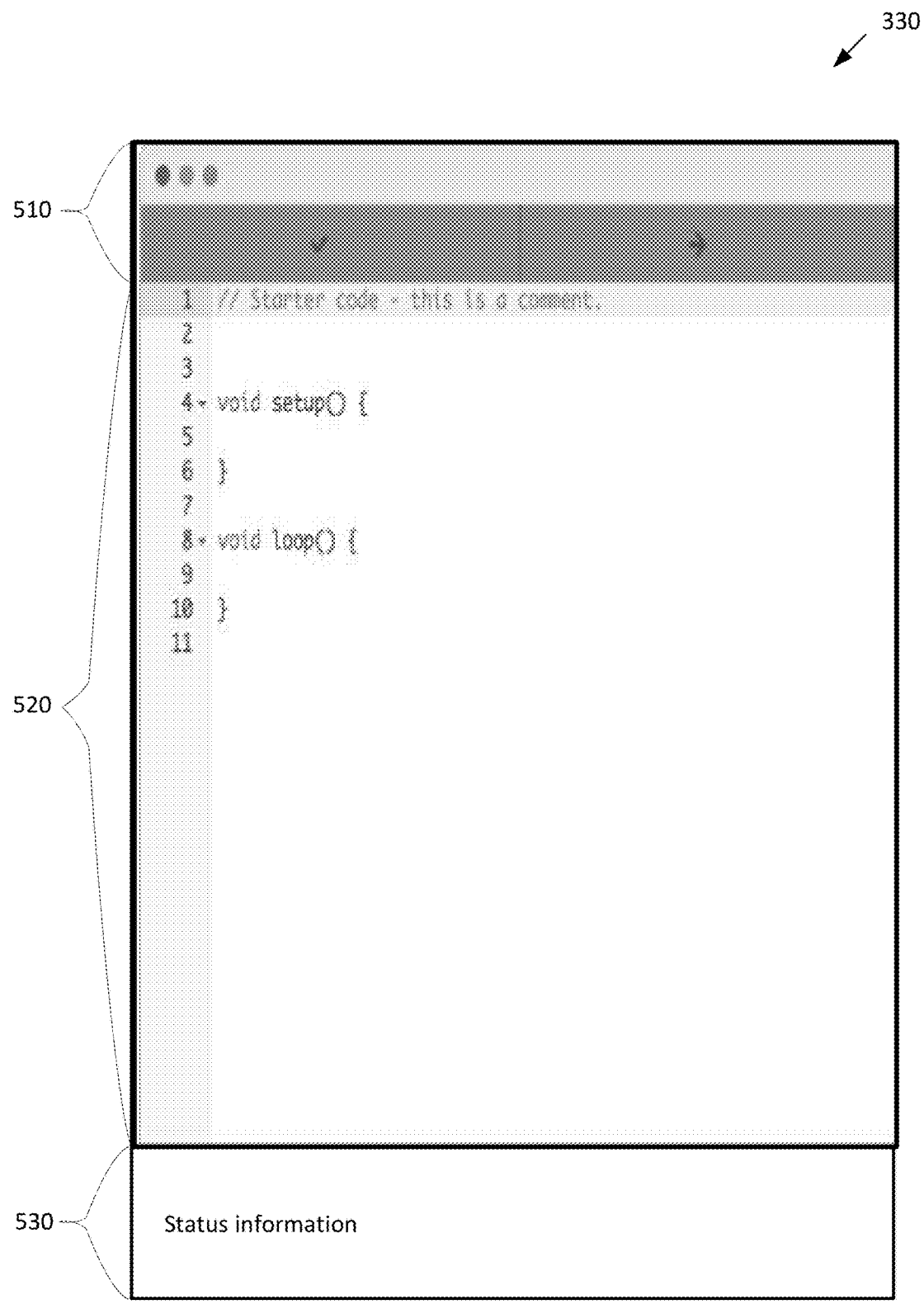
FIG. 5 illustrates an exemplary a screenshot of the interface panel of FIG. 3, according to various embodiments of the present invention.

FIG. 5 illustrates an exemplary a screenshot of the interface panel of FIG. 3, according to various embodiments of the present invention. In general, the interface panel 330 comprises a user interface for interfacing with the controller 160 of the target computing system 150 for entering and loading programming to the controller 160 for performing a current step of the tutorial. In addition, the interface panel 330 receives requested values/measurements from the controller 160 of the target computing system 150 during execution of the programming for a current step by the controller 160. The received values/measurements may then be used by the testing panel 340 for determining if the current step has been completed successfully. Thus, the interface panel 330 manages interface and communications between the tutorial system and the controller 160 of the target computing system 150 for loading programming onto the controller 160 and receiving values/measurements from the controller 160 during execution of the programming on the controller 160. In some embodiments, the interface panel 330 comprises a code editor (such as an IDE code editor).

As shown, the interface panel 330 includes a plurality of sections (sub-portions) including a first section 510, second section 520, and third section 530. The first section 510 displays selectable icons/buttons for performing programming operations, such as a first selectable icon for compiling programming currently displayed in the second section 520 and a second selectable icon for loading the programming currently displayed in the second section 520 to the controller 160 of the target computing system 150. The third section 530 comprises a status section that displays status information for the compiling and loading of programming to the controller 160 of the target computing system 150.

The second section 520 comprises a programming/code editor region that displays programming entered by the user. For example, for a current programming step, the instruction panel 320 may instruct the user to enter particular programming into the interface panel 330, and then compile and load the programming to the target computing system 150 for execution. The user may then copy the particular programming from the instruction panel 320 and paste the particular programming into the second section 520 of the interface panel 330, then select the compile icon and load icon to compile and load the programming to the target computing system 150 for execution. In some embodiments, the testing engine 140 may automatically generate test programming that is also to be compiled and loaded to the controller 160 of the target computing system 150 via the interface panel 330 for testing successful completion of a physical step or a programming step. In these embodiments, the test programming generated by the testing engine 140 is not displayed in the second section 520 so as not to confuse the user. In other embodiments, the test programming generated by the testing engine 140 may be displayed in the second section 520.

Figure 6:
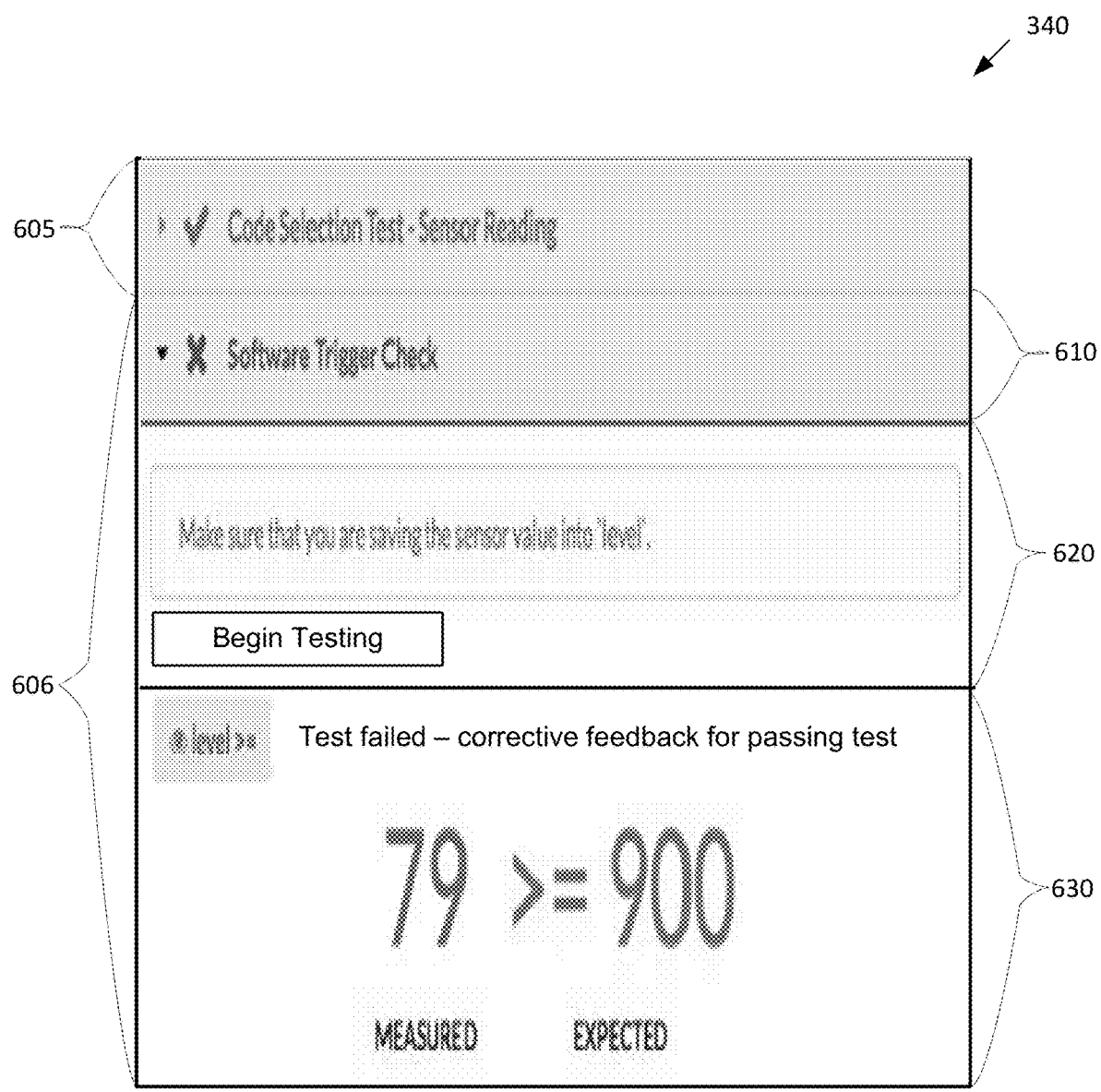
FIG. 6 illustrates an exemplary screenshot of the testing panel of FIG. 3, according to various embodiments of the present invention.

FIG. 6 illustrates an exemplary screenshot of the testing panel of FIG. 3, according to various embodiments of the present invention. In general, the testing panel 340 comprises a user interface for performing at least one test associated with a current step to determine if the current step has been performed correctly. The testing panel 340 further displays test results for the at least one test which indicates whether or not the current step has been performed correctly. If there is more than one test associated with a current step, all of the associated tests must be passed for the testing panel 340 to determine that the current step has been performed correctly. The types of tests may vary depending on the nature of the current step. For example, testing of physical steps may include verification of proper wiring and connections between components of the target computing system 150. Testing of programming steps may include verification of proper entering and loading of programming to the target computing system 150. Further tests may include testing the understanding of the user to verify that the user has learned certain information.

As shown, the testing panel 340 includes information for a first test 605 and a second test 606 associated with a current step, wherein both tests need to be passed before the user can progress to the next step in the tutorial. The testing panel 340 indicates that the first test 605 is passed and may collapse information for each passed test. The testing panel 340 indicates that the second test 606 is not passed. In some embodiments, for each test that is not passed, the testing panel 340 displays a plurality of sections (sub-portions) including a first section 610, second section 620, and third section 630. The first section 610 displays a name or title of the test. The second section 620 displays text instructions for setting up the test and/or an image or video visually illustrating how to set up the test. The second section 620 may further include selectable icons/buttons for executing functions associated with the test, such as a selectable icon for beginning/initiating testing after the user has attempted to perform the current step and/or has completed setting up the test.

The third section 630 displays testing results of the test, such as displaying one or more values/measurements based on the values/measurements received from the target computing system 150 during testing. The values from the target computing system 150 may be received via the interface panel 330 during testing and then subsequently used by the testing panel 340. For example, the one or more values displayed in the third section 630 may comprise the values received from the target computing system 150 themselves. As another example, the one or more values displayed in the third section 630 may comprise an average or mean of the values received from the target computing system 150, or comprise any other type of value derived or calculated from the values received from the target computing system 150. In further embodiments, the third section 630 may display the one or more values on a graph or display any other type of visual depiction of the one or more values.

Further, the testing panel 340 determines whether the current test has been passed based on the values received from the target computing system 150 and a predetermined threshold value or predetermined range of values associated with the particular test. For example, the testing panel 340 may determine whether the test has been passed by comparing the values received from the target computing system 150 to a predetermined threshold value or predetermined range of values. As another example, the testing panel 340 may determine whether the test has been passed by comparing one or more values derived or calculated from the values received from the target computing system 150 to a predetermined threshold value or predetermined range of values. If the values received from the target computing system 150 or one or more values derived from the values received from the target computing system 150 satisfy the predetermined threshold value or predetermined range of values, then the testing panel 340 determines that the test has been passed, otherwise the testing panel 340 determines that the test has not been passed. In additional embodiments, the third section 630 may also display the predetermined threshold value or predetermined range of values.

If the testing panel 340 determines that the test has been passed based on the received values, the third section 630 displays an indication to the user that the test has been passed. If the testing panel 340 determines that the test has not been passed based on the received values, the third section 630 displays an indication that the test has not been passed, as well as feedback messages that provide corrective feedback to assist the user to pass the test. The testing panel 340 may permit the user to repeat the test as many times as needed until the test is passed. Only if all tests associated with a current step are passed in the testing panel 340 is the "next step" icon in the instruction panel 320 then enabled, whereby the user can select the "next step" icon to progress to the next step in the tutorial.

Taxonomy for Defining Different Test Types

The tutorial system may implement different types of tests as defined by a taxonomy comprising a plurality of test dimensions/attributes. FIG. 7 illustrates a test taxonomy that can be implemented in the tutorial UI of FIG. 3, according to various embodiments of the present invention. As shown, the taxonomy is defined by a first test dimension 710 comprising test setup, a second test dimension 720 comprising test verification, and a third test dimension 730 comprising test domain, which results in 10 unique test types/classes.

The first test dimension 710 ("test setup") describes how a test is initialized and setup and can be specified by one of a plurality of test setup attributes/values including manual, automatic, or none. For a manual test setup, the user is required to perform additional actions after completing a current tutorial step to prepare for the test. For example, the user may place probes of the testing device on a specific hardware component of the target computing system 150, select a block of code, or manually engage a sensor to test if there is a desired outcome. For an automatic test setup, the tutorial system automatically performs any required initialization steps for the test, potentially behind-the-scenes without the user knowledge. For example, the tutorial system may automatically generate and load test programming to the target computing system 150 to test if a hardware component (e.g., LED lights) of the target computing system 150 is configured or functioning properly. For a "none" test setup, no setup is required, beyond the user completing the current step of the tutorial. For example, the test may be is based on actions of the user performing the tutorial (such as testing if the user clicked on a specified icon), the user may respond to a knowledge-based test, or the user manually confirms that a certain outcome resulted from the current step of the tutorial.

The second test dimension 720 ("test verification") describes how a test is verified and can be specified by one of a plurality of test setup attributes/values including manual or automatic. For manual test verification, the user is required to assess/determine if a test has been passed. It may sometimes be advantageous to have the user evaluate the success of a test to increase the user comprehension and understanding of the tutorial steps and to avoid the need for specialized hardware or instrumentation for testing. For example, the user could answer a question (such as "Does the light turn on when you press the button") to verify the test is passed. For an automatic test verification, the tutorial system automatically assesses/determines whether the test is passed without user intervention or assistance.

The third test dimension 730 ("test domain") describes if a test relates to a programming step ("software" test) or a physical step ("physical" test). Software tests can be used to test an aspect of a software-based step, such as testing that required programming for a current step has been entered properly by the user, that a variable in the programming produces expected value(s) during execution of the programming on the target computing system 150, or that the user understands what a specific line of programming is used for. Physical tests can be used to test an aspect of a hardware-based step, such as a hardware component being wired or inserted properly, or hardware component components functioning with an expected behavior.

In some embodiments, a software test or a physical test includes loading programming to the target computing system 150 via the interface panel 330 that includes at least one variable that will produce or be associated with one or more values during execution of the programming on the target computing system 150. In these embodiments, the tutorial system may automatically load programming to the target computing system 150 to configure the target computing system 150 to return the one or more values via the interface panel 330 for determining whether a programming step or physical step has been performed correctly based on expected values. For example, the programming may include a "buttonState" variable that indicates the state of the reset button 265*d*. The value of the "buttonState" variable is periodically read at execution/runtime of the programming on the target computing system from a particular pin on the microcontroller connected to the reset button 265*d*. The expected value for the "buttonState" variable is equal to 1 when the reset button 265*d* is pressed and is equal to 0 otherwise. As another example, the programming may include a "tempSensor" variable that indicates temperature. The value of the "tempSensor" variable is periodically read at execution/runtime of the programming on the target computing system from an analog input on the microcontroller connected to a temperature sensor which returns a temperature value/measurement. The expected values may comprise a particular temperature threshold or comprise a particular temperature range (e.g., 20-30C).

As shown in FIG. 7, the test taxonomy 700 includes 10 unique test types/classes comprising $S_{M,M}$ (software test with manual test setup and manual test verification), $P_{M,M}$ (physical test with manual test setup and manual test verification), $S_{M,A}$ (software test with manual test setup and automatic test verification), $P_{M,A}$ (physical test with manual test setup and automatic test verification), $S_{A,M}$ (software test with automatic test setup and manual test verification), $P_{A,M}$ (physical test with automatic test setup and manual test verification), $S_{A,A}$ (software test with automatic test setup and automatic test verification), $P_{A,A}$ (physical test with automatic test setup and automatic test verification), $S_{N,M}$ (software test with no test setup and manual test verification), and $P_{N,M}$ (physical test with no test setup and manual test verification).

The test types $S_{M,M}$ (software test with manual test setup and manual test verification) and $P_{M,M}$ (physical test with manual test setup and manual test verification) may comprise confirmation tests. For example, test type $S_{M,M}$ may require users to manually execute a programming step (such as enter, compile, and load particular programming to the target computing system 150) and then determine and report the outcome of the test by selecting a multiple choice or yes/no selectable icons displayed in the testing panel 340. For example, test type $P_{M,M}$ may require users to manually perform a physical action (such as push the reset button) and then determine and report the outcome of the test (such as the alarm turning off) by selecting a multiple choice or yes/no selectable icons displayed in the testing panel 340.

The test type $S_{M,A}$ (software test with manual test setup and automatic test verification) may comprise compile, load, and/or code selection tests. For example, the compile and load tests may be used to test the programming entered into the interface panel 330 by the user. When the test is run, the test compiles and uploads the user programming to target computing system 150 and the tutorial system automatically detects if the test is successful. In the code selection test, the user may be prompted to highlight a portion of the programming entered by the user and the tutorial system detects if the user highlighted the correct portion of programming. For example, a test may ask the user to "Highlight the part of your code which turns on the buzzer," and the tutorial system detects that the test is passed if the user highlights the correct portion of programming.

The test type $P_{M,A}$ (physical test with manual test setup and automatic test verification) may comprise testing of electrical attributes (such as a voltage, frequency, continuity, etc.) of the target computing system 150 using the optional testing device 175 via the second connection 180. For example, a current step may comprise a physical step whereby the user is to wire a particular hardware component 165 to the breadboard device 170 in a particular manner. After the user performs the current step, the testing panel 340 instructs the user to connect the probes of the testing device 175 to the breadboard device 170 in a particular manner. The user may then select a "begin testing" icon displayed in the testing panel 340 to begin testing. In response, the testing panel 340 automatically configures the testing device 175 to detect and return particular values/measurements (such as voltage, frequency, or continuity measurements). The testing panel 340 may do so by automatically generating, compiling, and loading programming to the testing device 175 via the interface panel 330 to configure the testing device 175 to detect and return the particular values. In these examples, the testing panel 340 thus configures the testing device 175 to perform the functions of a voltmeter, frequency analyzer, or continuity checker. The testing device 175 then executes the received programming and transmits the requested values to the interface panel 330. The values received by the interface panel 330 are then used by the testing panel 340 to determine if the test is passed when the expected value is achieved. For example, the testing panel 340 may compare the received values or one or more values derived from the received values to a predetermined threshold value or predetermined range of values to determine if the test is passed. If the test is passed, this indicates that the physical step was performed correctly by the user. The testing panel 340 may further display the received values or derived values graphically in real-time, as well as the predetermined threshold value or predetermined range of values.

The test type $S_{A,M}$ (software test with automatic test setup and manual test verification) may comprise a manual variable test. For example, a current step may comprise a programming step for the user to enter, compile, and load specific programming (referred to as the "user programming") to the target computing system 150 via the interface panel 330. The specific programming may comprise programming to configure the microcontroller 160 to perform one or more specific functions. The user programming may include at least one variable that will produce or be associated with one or more values during execution of the user programming on the target computing system 150. When the test is run, the testing panel 340 may then automatically insert additional programming within the user programming to configure the target computing system 150 to return values to the interface panel 330 for the at least one variable in the user programming during execution of the user programming. The target computing system 150 then executes all the programming (including the user programming and additional programming) and transmits the requested values for the at least one variable to the interface panel 330 via the first connection 155. The values received by the interface panel 330 are then displayed in the testing panel 340 to the user as well as the expected values for the at least one variable, such as a predetermined threshold value or predetermined range of values. The testing panel 340 may then prompt the user assess/determine whether the received values achieve the expected values by selecting yes/no selectable icons displayed in the testing panel 340. If the user selects the "yes" icon indicating that received values achieve the expected values, the testing panel 340 determines that the test is passed and the current programming step has been completed successfully by the user.

The test type $S_{A,A}$ (software test with automatic test setup and automatic test verification) may comprise an automatic variable test. The test type $S_{A,A}$ may operate similar to test type $S_{A,M}$ described above, except that the test verification for the received values are performed automatically by the testing panel 340, without user intervention or assistance. Thus, the values from the target computing system 150 that are received by the interface panel 330 are used by the testing panel 340 to determine whether the received values achieve the expected values and the test is passed. If so, the testing panel 340 displays an indication that the test is passed and the current programming step has been completed successfully by the user, thus allowing the user to proceed to the next step of the tutorial.

The test types $P_{A,M}$ (physical test with automatic test setup and manual test verification) and $P_{A,A}$ (physical test with automatic test setup and automatic test verification) test whether the user has physically setup a particular hardware component 165 correctly before proceeding to any programming steps for programming the particular hardware component 165. This allows the tutorial system and the user to isolate any hardware-based errors before any further steps for the particular hardware component 165 are performed. In the test types $P_{A,M}$ and $P_{A,A}$, the correct programming for the particular hardware component 165 (referred to as the "hardware programming") is automatically loaded to the target computing system 150 by the testing panel 340 to test the physical setup of the particular hardware component 165 and rule out any errors in the programming of the particular hardware component 165.

The test type $P_{A,M}$ (physical test with automatic test setup and manual test verification) may comprise an automatic load test. For example, the current step may comprise a physical step for the user to physically setup a particular hardware component 165 of the target computing system 150, such as physically configuring connections or wiring of the particular hardware component 165 to the microcontroller 160, another hardware component 165, and/or the breadboard device 170. After a user indicates that the user has completed the physical step (for example, by selecting the "Begin Testing" icon), the testing panel 340 automatically generates, compiles, and loads test programming comprising the correct programming associated with the particular hardware component 165 ("hardware programming"). The target computing system 150 then executes the test programming and transmits the requested values for the at least one variable to the interface panel 330 via the first connection 155. If the particular hardware component 165 is setup correctly by the user, execution of the test programming will initiate a particular function of the particular hardware component 165 and the particular hardware component 165 will produce a discernible result. For example, the particular hardware component 165 may comprise the piezo buzzer 265*c* and the test programming may comprise hardware programming that causes the piezo buzzer 265c to generate a beeping sound. After the test is run, the testing panel 340 may then prompt the user assess/determine whether the expected result is achieved (e.g., the buzzer beeps) by selecting yes/no selectable icons displayed in the testing panel 340. If the user selects the "yes" icon indicating that expected result is achieved, the testing panel 340 determines that the test is passed and the current physical step has been completed successfully by the user.

The test type $P_{A,A}$ (physical test with automatic test setup and automatic test verification) may comprise an automatic sense test. The test type $P_{A,A}$ may operate similar to test type $P_{A,M}$ described above, except that the test verification is performed automatically by the testing panel 340, without user intervention or assistance. For example, the current step may comprise a physical step for the user to physically setup a particular hardware component 165 of the target computing system 150. After a user indicates that the user has completed the physical step, the testing panel 340 automatically generates, compiles, and loads test programming comprising hardware programming associated with the particular hardware component 165 for configuring the target computing system 150 to return particular values during execution of the test programming. The hardware programming may include at least one variable that will produce or be associated with one or more values during execution of the hardware programming on the target computing system 150. The test programming further includes additional programming to configure the target computing system 150 to return values to the interface panel 330 for the at least one variable in the hardware programming during execution of the hardware programming. The target computing system 150 then executes the test programming (comprising the hardware programming and additional programming) and transmits the requested values for the at least one variable to the interface panel 330 via the first connection 155. If the particular hardware component 165 is setup correctly by the user, the received values for the at least one variable will achieve certain expected values. The values from the target computing system 150 that are received by the interface panel 330 are then used by the testing panel 340 to determine whether the received values achieve expected values and the test is passed. If so, the testing panel 340 displays an indication that the test is passed and the current physical step has been completed successfully by the user, thus allowing the user to proceed to the next step of the tutorial.

The test types $S_{N,M}$ (software test with no test setup and manual test verification) and $P_{N,M}$ (physical test with no test setup and manual test verification) may comprise user knowledge tests. For example, the testing panel 340 may display software or hardware-based knowledge questions that the user must answer correctly for the test to be passed. Such knowledge tests are used to test the user comprehension of concepts within a current step.

Methods for Testing Tutorial Steps

Figure 8:
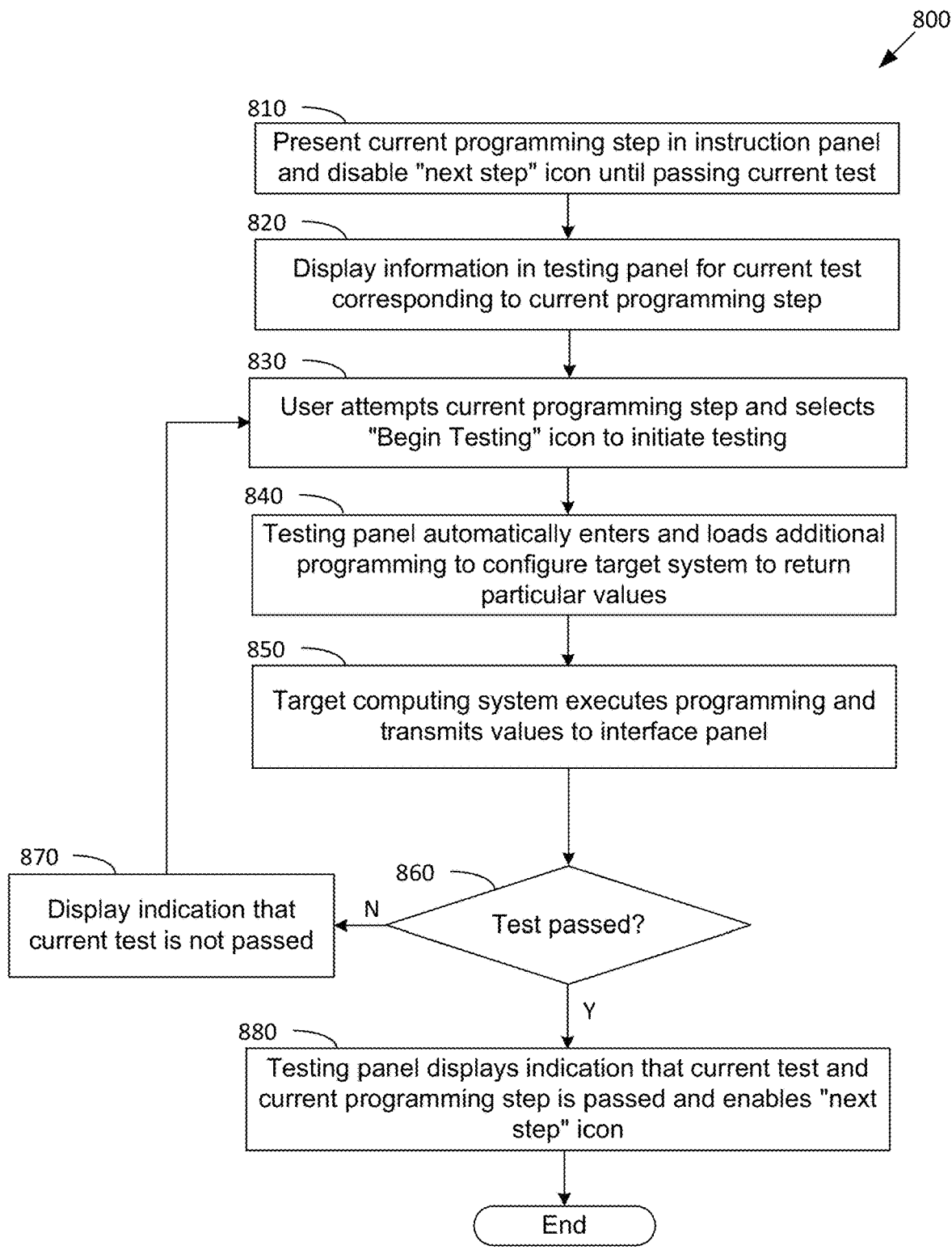
FIG. 8 illustrates a flow diagram of method steps for testing a programming step included in a tutorial for building a computer system, according to various embodiments of the present invention.

FIG. 8 illustrates a flow diagram of method steps for testing a programming step included in a tutorial for building a computer system, according to various embodiments of the present invention. Although the method steps are described in conjunction with the systems of FIGS. 1-7, persons skilled in the art will understand that the method steps can be performed in any order by any system.

In some embodiments, the method 800 may be performed by a tutorial system (executing a tutorial engine 110) in conjunction with a target computing system 150. In some embodiments, the target computing system 150 comprises a programmable microcontroller and at least one other hardware component that are to be configured to form a particular computing system or device that performs a particular set of functions (such as a light-sensitive alarm clock). Tutorial system presents a tutorial comprising a set/series of physical steps and programming steps that need to be completed successfully to properly configure the target computing system 150 to perform the particular set of functions. In some embodiments, the method 800 of FIG. 8 is performed to test a current programming step of the tutorial using a test comprising the $S_{A,A}$ type/class (software test with automatic test setup and automatic test verification), such as an automatic variable test.

The method 800 begins at step 810 when the tutorial engine 110 presents the current step in the instruction panel 320 of the tutorial UI 310. The current step may comprise a programming step for the user to enter, compile, and load particular programming to the target computing system 150 via the interface panel 330. For example, the tutorial engine 110 may display an image and/or video that graphically/visually illustrates how to perform the current step and/or a set of text instructions that describe how to perform the current step. In particular, the tutorial engine 110 may display instructions for the user to enter programming into the interface panel 330 and the particular programming to be entered into the interface panel 330. The particular programming may comprise programming to configure the microcontroller 160 to perform one or more specific functions. The tutorial engine 110 may further display selectable icons/buttons in the instruction panel 320 for navigating through the steps of the tutorial, such as a first icon ("back step" icon) for going back to a previous step and a second icon ("next step" icon) for moving forward to the next step of the tutorial. At step 810, the tutorial engine 110 disables the "next step" icon to prevent the user from proceeding to the next step until passing a current test for the current step.

At step 820, the tutorial engine 110 displays information in the testing panel 340 for a current test corresponding to the current step that has not been passed, such as displaying a first section 610, second section 620, and third section 630. The first section 610 displays a name or title of the test. The second section 620 displays a selectable icon for beginning/initiating testing ("Begin Testing") after the user has attempted to complete/perform the current step. The third section 630 displays testing results of the test, such as displaying one or more values based on the values received from the target computing system 150 during testing.

At step 830, the user attempts to complete/perform the current step and selects the "Begin Testing" icon in the testing panel 340 to initiate testing for the current step. For example, the user may enter the programming displayed in the instruction panel 320 (referred to as "user programming") into the interface panel 330 and selects the "Begin Testing" icon which indicates that the user has attempted to perform the current step and testing can begin. The user programming includes at least one variable that will produce, take on, or be associated with one or more values during execution of the user programming on the target computing system 150.

In response to step 830 being performed, at step 840, the testing panel 340 automatically generates and enters additional programming within the user programming into the interface panel 330 to configure the target computing system 150 to return the one or more values for the at least one variable in the user programming to the interface panel 330 during execution of the user programming. The additional programming may or may not be displayed in the interface panel 330. For example, testing panel 340 automatically searches for each variable in the user programming/code and adds programming/code around the variable that causes the microcontroller 160 of the target computing system 150 to transmit values for the variable over the first connection 155 during execution of the programming/code on the target computing system 150. Thus, testing panel 340 automatically configures the target computing system 150 to continuously send updated values for the variable during the entire time the programming/code is executing on the target computing system 150. At step 840, the testing panel 340 also compiles and loads all programming (comprising the user programming and the additional programming) to the target computing system 150 via first connection 155.

At step 850, the microcontroller 160 of the target computing system 150 receives and executes all programming (including the user programming and additional programming) and transmits the requested values (such as a set of one or more values) for the at least one variable to the interface panel 330 via the first connection 155. At step 860, the interface panel 330 receives the values for the at least one variable (such as the set of one or more values) and the testing panel 340 automatically determines if the current test is passed based on the received values, without relying on or receiving a user assessment of whether the current test is passed. The testing panel 340 determines that the current test is passed if the received values achieve predetermined expected values. For example, the testing panel 340 compares the received values or one or more values derived from the received values to a predetermined threshold value or a predetermined range of values. If the testing panel 340 determines that the received values or one or more values derived from the received values satisfies/achieves the predetermined threshold value or predetermined range of values, the testing panel 340 determines that the current test is passed and the current step is correctly performed by the user. Otherwise, the testing panel 340 determines that the current test is not passed and the current step is not correctly performed by the user. At step 860, the testing panel 340 may also display the received values or one or more values derived from the received values, as well as the expected values for the at least one variable (such as a predetermined threshold value or predetermined range of values). Thus, the testing panel 340 automatically determines if the current test is passed and the current step is correctly performed by the user based on the received values, without relying on or receiving a user determination of whether the current test is passed and the current step is correctly performed.

If, at step 860, the testing panel 340 determines that the current test is not passed, the method 800 proceeds to step 870. At step 870, the testing panel 340 displays an indication that the current test is not passed and the current step has not been completed successfully, as well as a feedback message that provides corrective feedback to assist the user to pass the current test and perform the current step successfully. Also, at step 870, the tutorial engine 110 continues to disable the "next step" icon to prevent the user from proceeding to the next step of the tutorial until passing the current test for the current step. The tutorial engine 110 may permit the user to repeat the current test as many times as needed until the current test is passed. The method 800 then proceeds to step 830 whereby the user attempts to complete/perform the current step and selects the "Begin Testing" icon in the testing panel 340 to initiate testing for the current step.

If, at step 860, the testing panel 340 determines that the current test is passed, the method 800 proceeds to step 880.

At step 880, the testing panel 340 displays an indication that the current test is passed and the current step has been completed successfully. Also, at step 880, the tutorial engine 110 enables the "next step" icon to allow the user to proceed to the next step in the set/series of step of the tutorial and presents the next step in the instruction panel 320. The method 800 then ends. Note that the method 800 of FIG. 8 may be repeated for each programming step of the tutorial.

Figure 9:
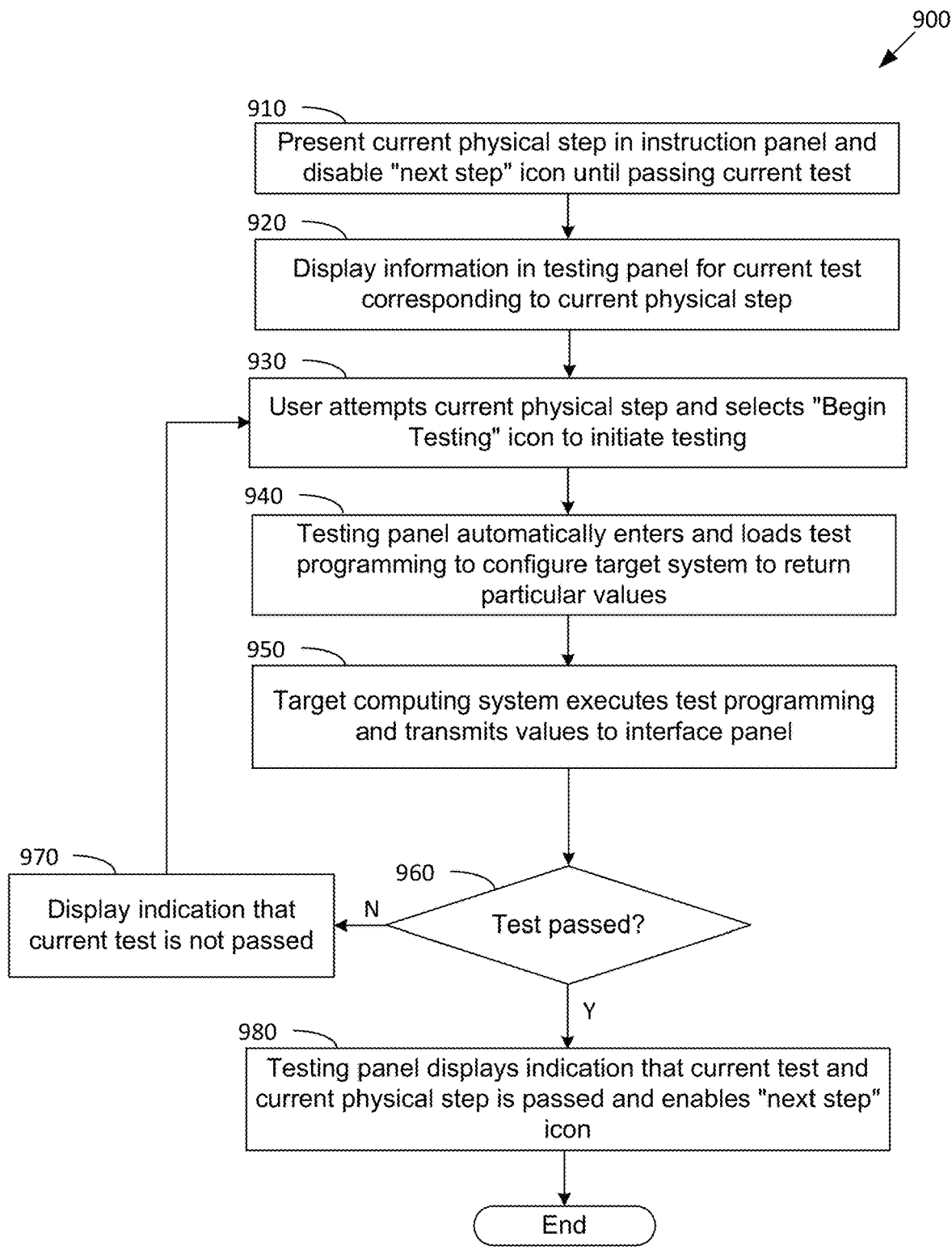
FIG. 9 illustrates a flow diagram of method steps for testing a physical step included in a tutorial for building a computer system, according to various embodiments of the present invention.

FIG. 9 illustrates a flow diagram of method steps for testing a physical step included in a tutorial for building a computer system, according to various embodiments of the present invention. Although the method steps are described in conjunction with the systems of FIGS. 1-7, persons skilled in the art will understand that the method steps can be performed in any order by any system.

In some embodiments, the method 900 may be performed by a tutorial system (executing a tutorial engine 110) in conjunction with a target computing system 150. In some embodiments, the target computing system 150 comprises a programmable microcontroller and at least one other hardware component that are to be configured to form a particular computing system or device that performs a particular set of functions (such as a light-sensitive alarm clock). Tutorial system presents a tutorial comprising a set/series of physical steps and programming steps that need to be completed successfully to properly configure the target computing system 150 to perform the particular set of functions. In some embodiments, the method 900 of FIG. 9 is performed to test a current physical step of the tutorial using a test comprising the $P_{A,A}$ type/class (physical test with automatic test setup and automatic test verification), such as an automatic sense test.

The method 900 begins at step 910 when the tutorial engine 110 presents the current step in the instruction panel 320 of the tutorial UI 310. For example, the current step may comprise a physical step for the user to physically configure or setup a particular hardware component 165 of the target computing system 150, such as physically configuring connections or wiring of the particular hardware component 165 to the microcontroller 160, another hardware component 165, and/or the breadboard device 170 of the target computing system 150. For example, the tutorial engine 110 may display an image and/or video that graphically/visually illustrates how to perform the current step and/or a set of text instructions that describe how to perform the current step. The tutorial engine 110 may further display selectable icons/buttons in the instruction panel 320 for navigating through the steps of the tutorial, such as a first icon ("back step" icon) for going back to a previous step and a second icon ("next step" icon) for moving forward to the next step of the tutorial. At step 910, the tutorial engine 110 disables the "next step" icon to prevent the user from proceeding to the next step until passing a current test for the current step.

At step 920, the tutorial engine 110 displays information in the testing panel 340 for a current test corresponding to the current step that has not been passed, such as displaying a first section 610, second section 620, and third section 630. The first section 610 displays a name or title of the test. The second section 620 displays a selectable icon for beginning/initiating testing ("Begin Testing") after the user has attempted to complete/perform the current step. The third section 630 displays testing results of the test, such as displaying one or more values based on the values received from the target computing system 150 during testing.

At step 930, the user attempts to complete/perform the current step and selects the "Begin Testing" icon in the testing panel 340 to initiate testing for the current step. For example, the user attempts to physically configure the particular hardware component 165 and selects the "Begin Testing" icon which indicates that the user has attempted to perform the current step and testing can begin.

In response to step 930 being performed, at step 940, the testing panel 340 automatically generates and enters test programming into the interface panel 330. The test programming includes the correct hardware programming corresponding to the particular hardware component 165. The hardware programming includes at least one variable that produces, takes on, or is associated with one or more values during execution of the hardware programming on the target computing system 150. The test programming further includes additional programming to configure the target computing system 150 to return the values for the at least one variable to the interface panel 330 during execution of the hardware programming. The test programming may or may not be displayed in the interface panel 330. For example, testing panel 340 automatically searches for each variable in the hardware programming and adds programming around the variable that causes the microcontroller 160 of the target computing system 150 to transmit values for the variable over the first connection 155 during execution of the programming on the target computing system 150. Thus, testing panel 340 automatically configures the target computing system 150 to continuously send updated values for the variable during the entire time the programming is executing on the target computing system 150. At step 940, the testing panel 340 also compiles and loads the test programming to the target computing system 150 via first connection 155.

At step 950, the microcontroller 160 of the target computing system 150 receives and executes the test programming and transmits the requested values for the at least one variable (such as a set of one or more values) to the interface panel 330 via the first connection 155. At step 960, the interface panel 330 receives the values for the at least one variable (such as the set of one or more values) and the testing panel 340 automatically determines if the current test is passed based on the received values, without relying on or receiving a user assessment of whether the current test is passed. If the particular hardware component 165 is physically configured correctly by the user, the received values for the at least one variable will achieve certain expected values. For example, the testing panel 340 compares the received values or one or more values derived from the received values to a predetermined threshold value or a predetermined range of values. If the testing panel 340 determines that the received values or one or more values derived from the received values satisfies/achieves the predetermined threshold value or predetermined range of values, the testing panel 340 determines that the current test is passed and the current step is correctly performed by the user. Otherwise, the testing panel 340 determines that the current test is not passed and the current step is not correctly performed by the user.

At step 960, the testing panel 340 may also display the received values or one or more values derived from the received values, as well as the expected values for the at least one variable (such as a predetermined threshold value or predetermined range of values). Thus, the testing panel 340 automatically determines if the current test is passed and the current step is correctly performed by the user based on the received values, without relying on or receiving a user determination of whether the current test is passed and the current step is correctly performed.

If, at step 960, the testing panel 340 determines that the current test is not passed, the method 900 proceeds to step 970. At step 970, the testing panel 340 displays an indication that the current test is not passed and the current step has not been completed successfully, as well as a feedback message that provides corrective feedback to assist the user to pass the current test and perform the current step successfully. Also, at step 970, the tutorial engine 110 continues to disable the "next step" icon to prevent the user from proceeding to the next step of the tutorial until passing the current test for the current step. The tutorial engine 110 may permit the user to repeat the current test as many times as needed until the current test is passed. The method 900 then proceeds to step 930 whereby the user attempts to complete/perform the current step and selects the "Begin Testing" icon in the testing panel 340 to initiate testing for the current step.

If, at step 960, the testing panel 340 determines that the current test is passed, the method 900 proceeds to step 980. At step 980, the testing panel 340 displays an indication that the current test is passed and the current step has been completed successfully. Also, at step 980, the tutorial engine 110 enables the "next step" icon to allow the user to proceed to the next step in the set/series of steps of the tutorial and presents the next step in the instruction panel 320. The method 900 then ends. Note that the method 900 of FIG. 9 may be repeated for each physical step of the tutorial.

In sum, a tutorial system presents a tutorial comprising a series of steps for building a target computing system and testing successful completion of at least one of the steps of the tutorial. In this regard, the tutorial system presents a test-driven tutorial whereby a current step of the tutorial is presented to the user, successful completion of the current step is tested by the tutorial system to determine whether the current step is performed correctly by the user, and the tutorial progresses to the next step upon determining that the current step is correctly performed by the user. The tutorial system is coupled to the target computing system via a first connection. The tutorial system may directly test successful completion of a physical step or a programming step through values received from the target computing system via the first connection. Thus, tutorial system may directly test successful completion of a physical step or a programming step without rely on or receiving user assessments of the successful completion of a step.

In some embodiments, the target computing system comprises a programmable microcontroller and at least one other hardware component that is to be configured to form a particular computing system or device that performs a particular set of functions (such as a light-sensitive alarm clock). The tutorial system may present a tutorial comprising one or more programming steps for configuring the programming executed by the microcontroller and one or more physical steps for physically setting up/configuring the microcontroller and hardware components.

The tutorial system may present one or more programming steps for the user to enter, compile, and load specific programming to the microcontroller. The tutorial system may automatically insert additional programming to configure the microcontroller to return requested values during execution of the user programming. During execution of the programming by the microcontroller, the microcontroller then transmits the requested values to the tutorial system via the first connection. The tutorial system then tests if the programming step is passed by determining if the programming step was performed correctly based on the received values.

The tutorial system may further present one or more physical steps for the user to physically configure/setup a particular hardware component, such as physically configuring connections or wiring between the particular hardware component and the microcontroller and/or another hardware component of the target computing system. After a user indicates that the user has completed the physical step, the tutorial system automatically generates, compiles, and loads test programming associated with the physical step and/or the particular hardware component to configure the microcontroller to return particular values during execution of the test programming. During execution of the test programming by the microcontroller, the microcontroller then transmits the requested values to the tutorial system via the first connection. The tutorial system then tests if the physical step is passed by determining if the physical step was performed correctly based on the received values.

In further embodiments, if the tutorial system determines that a current step has been performed correctly by the user, the tutorial system displays an indication to the user that the current step is successfully completed and permits the user to progress to a next step of the tutorial. If the tutorial system determines that a current step has not been performed correctly by the user, the tutorial system displays an indication to the user that the current step has not been successfully completed and does not permit the user to progress to a next step of the tutorial until the current step is successfully completed.

At least one technological improvement of the disclosed techniques relative to prior art is that the tutorial system displays a physical step for building a target computing system and can determine whether the physical step has been performed correctly by a user based on values received from the target computing system. Thus, the disclosed techniques enable the tutorial system to automatically assess/determine whether a physical step for building a target computing system has been performed correctly by the user, without having to rely on any input or feedback from the user assessment.

At least one other technological improvement of the disclosed techniques relative to prior art is that the tutorial system can determine whether a current physical step has been performed correctly by a user and, if not, stop the progression of the tutorial until the current physical step is determined to have performed correctly by the user. In this manner, the tutorial system can accurately monitor and control the progression of the steps in a given tutorial to ensure that each step has been performed correctly by the user before progressing to the next step in the tutorial. Thus, the disclosed techniques allow users to more easily progress though a tutorial for building computing systems, reduce the time needed to complete the tutorial by substantially eliminating backtracking and troubleshooting errors made in earlier steps in the tutorial, increase the rate for successfully completing the tutorial, and improves user comprehension and confidence in building computing systems.

Aspects of the subject matter described herein are set out in the following numbered any of clauses.

1. In some embodiments, a computer-implemented method comprising: displaying to a user a first step for physically configuring a first hardware component of a target computing system; once the first hardware component is configured, receiving a first set of values from a controller included in the target computing system via a first connection; determining whether the first step has been performed correctly based on the first set of values; in response to determining that the first step has been performed correctly, displaying to the user an indication that the first step has been performed correctly; and in response to determining that the first step has not been performed correctly, displaying to the user an indication that the first step has not been performed correctly.

2. The computer-implemented method of clause 1, further comprising loading a test program into the controller via the first connection, wherein the first set of values are generated when the test program is executed.

3. The computer-implemented method of any of clauses 1-2, wherein the first step comprises physically connecting the first hardware component to the controller.

4. The computer-implemented method of any of clauses 1-3, further comprising, in response to determining that the first step has been performed correctly, displaying a next step to the user, wherein the first step and the next step are included in a tutorial associated with building the target computing system.

5. The computer-implemented method of any of clauses 1-4, further comprising, in response to determining that the first step has not been performed correctly, not permitting the tutorial to proceed to a next step, wherein the first step and the next step are included in a tutorial associated with building the target computing system.

6. The computer-implemented method of any of clauses 1-5, wherein determining whether the first step is performed correctly comprises comparing the first set of values to a predetermined threshold value or a predetermined range of values.

7. The computer-implemented method of any of clauses 1-6, wherein the controller comprises a programmable microcontroller.

8. The computer-implemented method of any of clauses 1-7, further comprising: displaying to the user a second step that is related to programming the controller; loading user programming to the controller via the first connection for execution by the controller; receiving a second set of values from the controller via the first connection; and determining whether the second step has been performed correctly based on the second set of values.

9. The computer-implemented method of any of clauses 1-8, further comprising, in response to determining that the second step has performed correctly, displaying to the user an indication that the second step has performed correctly, and displaying a next step to the user, wherein the first step, the second step, and the next step are included in a tutorial associated with building the target computing system.

10. In some embodiments, a non-transitory computer-readable medium storing program instructions that, when executed by a processor, cause the processor to perform the steps of: displaying to a user a first step for physically configuring a first hardware component of a target computing system; once the first hardware component is configured, receiving a first set of values from a controller included in the target computing system via a first connection; determining whether the first step has been performed correctly based on the first set of values; in response to determining that the first step has been performed correctly, displaying to the user an indication that the first step has been performed correctly; and in response to determining that the first step has not been performed correctly, displaying to the user an indication that the first step has not been performed correctly.

11. The non-transitory computer-readable medium of clause 10, further comprising loading a test program into the controller via the first connection, wherein the first set of values are generated when the test program is executed.

12. The non-transitory computer-readable medium of any of clauses 10-11, wherein the first step comprises physically connecting the first hardware component to the controller.

13. The non-transitory computer-readable medium of any of clauses 10-12, further comprising, in response to determining that the first step has been performed correctly, displaying a next step to the user, wherein the first step and the next step are included in a tutorial associated with building the target computing system.

14. The non-transitory computer-readable medium of any of clauses 10-13, wherein displaying to the user the first step for physically configuring the first hardware component comprises displaying an image or video illustrating how to perform the first step.

15. The non-transitory computer-readable medium of any of clauses 10-14, wherein displaying to the user the first step for physically configuring the first hardware component comprises displaying a set of text instructions for performing the first step.

16. The non-transitory computer-readable medium of any of clauses 10-15, further comprising: displaying to the user a second step that is related to programming the controller; loading user programming to the controller via the first connection for execution by the controller; receiving a second set of values from the controller via the first connection; and determining whether the second step has been performed correctly based on the second set of values.

17. The non-transitory computer-readable medium of any of clauses 10-16, further comprising, in response to determining that the second step has performed correctly, displaying to the user an indication that the second step has performed correctly, and displaying a next step to the user, wherein the first step, the second step, and the next step are included in a tutorial associated with building the target computing system.

18. In some embodiments, a system, comprising: a memory that includes a tutorial engine; and a processor that is coupled to the memory and, upon executing the tutorial engine, is configured to perform the steps of: displaying to a user a first step for physically configuring a first hardware component of a target computing system; once the first hardware component is configured, receiving a first set of values from a controller included in the target computing system via a first connection; determining whether the first step has been performed correctly based on the first set of values; in response to determining that the first step has been performed correctly, displaying to the user an indication that the first step has been performed correctly; and in response to determining that the first step has not been performed correctly, displaying to the user an indication that the first step has not been performed correctly.

19. The system of clause 18, wherein the controller comprises a programmable microcontroller.

20. The system of any of clauses 18-19, wherein the first step comprises physically connecting the first hardware component to a second hardware component of the target computing system.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    displaying, by a tutorial computing system via a display device, a first target step for a user to physically modify a first hardware component included in a target computing system in order to modify a physical configuration of the target computer system from an initial physical configuration to a target physical configuration, wherein:
        the target computing system is separate from the tutorial computing system, and
        the target computing system is connected to the tutorial computing system via a first connection;
    receiving, by the tutorial computing system, an indication that the user has performed a physical action associated with the first hardware component to generate a physically-modified target computing system;
    receiving, by the tutorial computing system from a controller included in the physically-modified target computing system via the first connection, a first feedback signal that includes a first set of values produced by the physically-modified target computing system performing an operation, wherein the user correctly performing first target step causes the target computing system to be in the target physical configuration that generates a target set of values when performing the operation;
    comparing the first set of values to the target set of values to determine whether the user correctly performed the first target step when generating the physically-modified target computing system;
    in response to determining that the user correctly performed the first target step:
        determining that the physically-modified target computing system is in the target physical configuration, and
        displaying to the user an indication that the first target step has been performed correctly; and
    in response to determining that the user did not correctly perform the first target step:
        determining that the physically-modified target computing system is not in the target physical configuration, and
        displaying to the user an indication that the first target step has not been performed correctly.

2. The computer-implemented method of claim 1, further comprising:
    loading a test program into the controller via the first connection, wherein
        performing the operation comprises executing at least a portion of the test program.

3. The computer-implemented method of claim 1, further comprising:
    in response to determining that the user correctly performed the first target step,
        displaying to the user a next target step to physically modify a second hardware component of the target computing system,
    wherein the first target step and the next target step are included in a tutorial associated with the user physically modifying the target computing system, and
    wherein the physical action performed by the user comprises one of: (i) adding the second hardware component to a breadboard, (ii) removing the second hardware component from the breadboard, or (iii) modifying a wired connection between the second hardware component and another component.

4. The computer-implemented method of claim 1, further comprising:
    in response to determining that the user incorrectly performed the first target step, not permitting the user to proceed to a next target step to physically modify a second hardware component of the target computing system,
    wherein the first target step and the next target step are included in a tutorial associated with the user physically modifying the target computing system, and
    wherein the first hardware component comprises one of: (i) a light-emitting diode, (ii) a light sensor, (iii) a piezoelectric buzzer, or (iv) a reset button.

5. The computer-implemented method of claim 1, wherein comparing the first set of values to the target set of values comprises comparing the first set of values to a predetermined threshold value or a predetermined range of values that is associated with the target set of values.

6. The computer-implemented method of claim 1, wherein the controller comprises a programmable microcontroller.

7. The computer-implemented method of claim 1, further comprising:
    displaying to the user a second target step that is related to programming the controller;
    loading, from the tutorial computing system to the controller via the first connection, a set of user programming for execution by the controller;
    receiving, by the tutorial computing system, a second set of values from the controller via the first connection, wherein:
        the user correctly performing the second target step causes the target computing system to execute a target program that generates a second target set of values when performing the operation
        the target computing system executes the set of user programming to generate the second set of values; and
    determining whether the user correctly performed the second target step based on the second set of values by comparing the second set of values to the second target set of values.

8. The computer-implemented method of claim 7, further comprising, in response to determining that the user correctly performed the second target step:
    displaying to the user an indication that the second target step has performed correctly, and
    displaying a next target step to the user,
    wherein the first target step, the second target step, and the next target step are included in a tutorial associated with building and programming the target computing system.

9. One or more non-transitory computer-readable media storing program instructions that, when executed by one or more processors, cause the one or more processors to perform the steps of:
  displaying, by a tutorial computing system via a display device, a first target step for a user to physically modify a first hardware component included in a target computing system in order to modify a physical configuration of the target computer system from an initial physical configuration to a target physical configuration, wherein:
    the target computing system is separate from the tutorial computing system, and
    the target computing system is connected to the tutorial computing system via a first connection;
  receiving, by the tutorial computing system, an indication that the user has performed a physical action associated with the first hardware component to generate a physically-modified target computing system;
  receiving, by the tutorial computing system from a controller included in the physically-modified target computing system via the first connection, a first feedback signal that includes a first set of values produced by the physically-modified target computing system performing an operation, wherein the user correctly performing first target step causes the target computing system to be in the target physical configuration that generates a target set of values when performing the operation;
  comparing the first set of values to the target set of values to determine whether the user correctly performed the first target step when generating the physically-modified target computing system;
  in response to determining that the user correctly performed the first target step:
    determining that the physically-modified target computing system is in the target physical configuration, and
    displaying to the user an indication that the first target step has been performed correctly; and
  in response to determining that the user did not correctly perform the first target step:
    determining that the physically-modified target computing system is not in the target physical configuration, and
    displaying to the user an indication that the first target step has not been performed correctly.

10. The one or more non-transitory computer-readable media of claim 9, further comprising:
  loading a test program into the controller via the first connection, wherein
    performing the operation comprises executing at least a portion of the test program.

11. The one or more non-transitory computer-readable media of claim 9, further comprising:
  in response to determining that the user correctly performed the first target step,
    displaying to the user a next target step to physically modify a second hardware component of the target computing system,
  wherein the first target step and the next target step are included in a tutorial associated with the user physically modifying the target computing system.

12. The one or more non-transitory computer-readable media of claim 9, wherein displaying to the user the first target step for physically modifying the first hardware component comprises displaying an image or video illustrating how to perform the first target step.

13. The one or more non-transitory computer-readable media of claim 9, wherein displaying to the user the first target step for physically modifying the first hardware component comprises displaying a set of text instructions for physically performing the first target step.

14. The one or more non-transitory computer-readable media of claim 9, further comprising:
  displaying to the user a second target step that is related to programming the controller;
  loading, from the tutorial computing system to the controller via the first connection, a set of user programming for execution by the controller;
  receiving, by the tutorial computing system, a second set of values from the controller via the first connection, wherein:
    the user correctly performing the second target step causes the target computing system to execute a target program that generates a second target set of values when performing the operation
    the target computing system executes the set of user programming to generate the second set of values; and
  determining whether the user correctly performed the second target step based on the second set of values by comparing the second set of values to the second target set of values.

15. The one or more non-transitory computer-readable media of claim 14, further comprising, in response to determining that the user correctly performed the second target step:
  displaying to the user an indication that the second target step has performed correctly, and
  displaying a next target step to the user,
  wherein the first target step, the second target step, and the next target step are included in a tutorial associated with building and programming the target computing system.

16. A system, comprising:
  a memory that includes a tutorial engine; and
  a processor that is coupled to the memory and, upon executing the tutorial engine, is configured to perform the steps of:
    displaying, by a tutorial computing system via a display device, a first target step for a user to physically modify a first hardware component included in a target computing system in order to modify a physical configuration of the target computer system from an initial physical configuration to a target physical configuration, wherein:
      the target computing system is separate from the tutorial computing system, and
      the target computing system is connected to the tutorial computing system via a first connection;
    receiving, by the tutorial computing system, an indication that the user has performed a physical action associated with the first hardware component to generate a physically-modified target computing system;
    receiving, by the tutorial computing system from a controller included in the physically-modified target computing system via the first connection, a first feedback signal that includes a first set of values produced by the physically-modified target computing system performing an operation, wherein the user correctly performing first target step causes the target computing system to be in the target physical configuration that generates a target set of values when performing the operation;

comparing the first set of values to the target set of values to determine whether the user correctly performed the first target step when generating the physically-modified target computing system;

in response to determining that the user correctly performed the first target step:
  determining that the physically-modified target computing system is in the target physical configuration, and
  displaying to the user an indication that the first target step has been performed correctly; and in response to determining that the user did not correctly perform the first target step:
  determining that the physically-modified target computing system is not in the target physical configuration, and
  displaying to the user an indication that the first target step has not been performed correctly.

17. The system of claim 16, wherein the controller comprises a programmable microcontroller.

18. The system of claim 16, wherein the processor is further configured to perform the step of:

in response to determining that the user correctly performed the first target step,
  displaying to the user a next target step to physically modify a second hardware component of the target computing system,
wherein the first target step and the next target step are included in a tutorial associated with the user physically modifying the target computing system.

19. The system of claim 16, wherein the processor is further configured to perform the step of:

in response to determining that the user incorrectly performed the first target step, not permitting the user to proceed to a next target step to physically modify a second hardware component of the target computing system,
wherein the first target step and the next target step are included in a tutorial associated with the user physically modifying the target computing system.

20. The system of claim 16, wherein comparing the first set of values to the target set of values comprises comparing the first set of values to a predetermined threshold value or a predetermined range of values that is associated with the target set of values.

* * * * *

UNITED STATES PATENT AND TRADEMARK OFFICE
CERTIFICATE OF CORRECTION

PATENT NO. : 11,423,801 B2  Page 1 of 1
APPLICATION NO. : 16/051387
DATED : August 23, 2022
INVENTOR(S) : Tovi Grossman et al.

It is certified that error appears in the above-identified patent and that said Letters Patent is hereby corrected as shown below:

On the Title Page

Item [56], delete "Wiillliams et al., AXIS: Generating Explanations at Scale with Learnersourcing and Machine Learning. In Proceedings of the Third (2016) ACM Conference on Learning @ Scale (L@S'16), 379-388. https://doi.org/10.1145/2876034.2876042, Apr. 25-26, 2016, 10 pages." and insert --Williams et al., AXIS: Generating Explanations at Scale with Learnersourcing and Machine Learning. In Proceedings of the Third (2016) ACM Conference on Learning @ Scale (L@S'16), 379-388.https://doi.org/10.1145/2876034.2876042, Apr. 25-26, 2016, 10 pages--;

In the Claims

Column 26, Claim 4, Line 25, delete "(i) a" and insert --(i) an--.

Signed and Sealed this
Twenty-second Day of November, 2022

Katherine Kelly Vidal
*Director of the United States Patent and Trademark Office*